US009112656B2

(12) United States Patent
Ouchi et al.

(10) Patent No.: US 9,112,656 B2
(45) Date of Patent: Aug. 18, 2015

(54) MOBILE COMMUNICATION SYSTEM, BASE STATION APPARATUS, MOBILE STATION APPARATUS AND COMMUNICATION METHOD

(75) Inventors: Wataru Ouchi, Osaka (JP); Tatsushi Aiba, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 18 days.

(21) Appl. No.: 13/812,228

(22) PCT Filed: Jul. 8, 2011

(86) PCT No.: PCT/JP2011/065711
§ 371 (c)(1),
(2), (4) Date: Mar. 5, 2013

(87) PCT Pub. No.: WO2012/017780
PCT Pub. Date: Feb. 9, 2012

(65) Prior Publication Data
US 2013/0163571 A1 Jun. 27, 2013

(30) Foreign Application Priority Data
Aug. 3, 2010 (JP) ................................. 2010-174365

(51) Int. Cl.
*H04W 4/00* (2009.01)
*H04L 5/00* (2006.01)
*H04W 72/04* (2009.01)

(52) U.S. Cl.
CPC ........... *H04L 5/0048* (2013.01); *H04W 72/042* (2013.01); *H04L 5/001* (2013.01); *H04L 5/0053* (2013.01)

(58) Field of Classification Search
CPC ..... H04L 5/0048; H04L 7/0008; H04L 5/001; H04L 5/0053; H03F 1/3235; H04W 72/04; H04W 72/0413; H04W 72/042

USPC ......... 370/210, 252, 256, 280, 328–330, 336, 370/343–344; 455/422.1, 452.1, 456, 450, 455/509
See application file for complete search history.

(56) References Cited

U.S. PATENT DOCUMENTS

2010/0034152 A1* 2/2010 Imamura ....................... 370/329
2011/0086644 A1* 4/2011 Dahlman et al. .............. 455/450

(Continued)

OTHER PUBLICATIONS

Ericsson, "Carrier aggregation in LTE-Advanced", TSG-RAN WG1 #53bis, Jun. 30-Jul. 4, 2008, R1-082468, 8 pages.

(Continued)

*Primary Examiner* — Charles C Jiang
*Assistant Examiner* — Mohamed Kamara
(74) *Attorney, Agent, or Firm* — Birch, Stewart, Kolasch & Birch, LLP

(57) ABSTRACT

To provide a mobile communication system and communication method for efficient scheduling to be performed when a base station apparatus notifies a mobile station apparatus of a plurality of downlink control information formats in the same subframe and/or for some particular time period, in a mobile communication system comprised of a base station apparatus and a mobile station apparatus, the base station apparatus notifies the mobile station apparatus of a plurality of downlink control information formats including at least one downlink control information format including instructions for transmission of a sounding reference signal and a parameter in the same subframe, and the mobile station apparatus transmits a sounding reference signal set based on the parameter to the base station apparatus when among the plurality of downlink control information formats, a predetermined downlink control information format includes instructions for transmission of a sounding reference signal and the parameter.

4 Claims, 10 Drawing Sheets

(56) References Cited

U.S. PATENT DOCUMENTS

2011/0222485 A1* 9/2011 Nangia et al. .................. 370/329
2013/0223415 A1* 8/2013 Higuchi et al. ............... 370/336

OTHER PUBLICATIONS

Ericsson, ST-Ericsson, "Further Details on SRS for Release 10", TSG-RAM WG1 #60bis, R1-101746.
International Search Report for PCT/JP2011/065711 dated Sep. 13, 2011.
Motorola, "Aperiodic SRS for LTE-A", 3GPP TSG RAN1#60bis, R1-102114, Apr. 12-16, 2010, 2 pages.
Motorola, "LTE-A Dynamic Aperiodic SRS—Triggering, Duration, Timing, and Carrier Aggregation", 3GPP TSG RAN WG1 Meeting #61, R1-103187, May 10-14, 2010, 4 pages.
Motorola, "Views on SRS Enhancements for LTE-A", 3GPP TSG RAN WG1 Meeting #60bis, Apr. 12-16, 2010, R1-102142, 5 pages.
Qualcomm Incorporated, "SRS Enhancements for LTE-A", 3GPP TSG-RAN WG1 #60bis, Apr. 12-16, 2010, R1-102341, 4 pages.
Samsung, "Resource Allocation for Dynamic SRS Activation and SRS Multiplexing" 3GPP TSG RAN WG1 #60bis, R1-102215, Apr. 12-16, 2010, 3 pages.
Sharp, "Necessity of Multi-shot Dynamic Aperiodic SRS", 3GPP TSG RAN WG1 Meeting #61bis, R1-103726, Jun. 28-Jul. 2, 2010, 6 pages.
Texas Instruments, "Outstanding issues on dynamic aperiodic SRS" 3GPP TSG RAN WG1 #61bis, R1-103711, Jun. 28-Jul. 2, 2010, 3 pages.
Texas Instruments, "Signaling considerations for dynamic aperiodic SRS", 3GPP TSG RAN WG1 #61, R1-102830, May 10-14, 2010, 4 pages.
Samsung, "Resources for Dynamic SRS Activation and SRS Multiplexing in Rel-10", 3GPP TSG RAN WG1 #61, 6.5.2.1, R1-103039, Montreal, Canada, May 10-14, 2010.

* cited by examiner

MOBILE COMMUNICATION SYSTEM, BASE STATION APPARATUS, MOBILE STATION APPARATUS AND COMMUNICATION METHOD

TECHNICAL FIELD

The present invention relates to a mobile communication system and communication method comprised of base station apparatuses and mobile station apparatuses.

BACKGROUND ART

The 3GPP (3rd Generation Partnership Project) is a project for studying and preparing specifications of mobile communication systems based on networks evolved from W-CDMA (Wideband-Code Division Multiple Access) and GSM (Global System for Mobile Communications). The 3GPP standardized W-CDMA systems as the 3G cellular mobile communication system, and the services have been started sequentially. Further, the 3GPP has standardized HSDPA (High-Speed Downlink Packet Access) with communication rates further increased, and the services have been started. In the 3GPP, using evolution (hereinafter, also referred to as "LTE (Long Term Evolution)" or "EUTRA (Evolved Universal Terrestrial Radio Access)") of the 3G radio access techniques and wider frequency bands, studies have proceeded on mobile communication systems (hereinafter, also referred to as "LTE-A (Long Term Evolution-Advanced)" or "Advanced-EUTRA") for actualizing transmission and reception of data of higher rates.

As the communication schemes in LTE, considered are an OFDMA (Orthogonal Frequency Division Multiple Access) scheme for performing user multiplexing using mutually orthogonal subcarriers, and an SC-FDMA (Single Carrier-Frequency Division Multiple Access) scheme. In other words, the OFDMA scheme that is a multicarrier communication scheme is proposed in downlink, and the SC-FDMA scheme that is a single-carrier communication scheme is proposed in uplink.

Meanwhile, as the communication schemes in LTE-A, the OFDMA scheme is considered in downlink, and in uplink, in addition to the SC-FDMA scheme, it is considered to introduce a Clustered-SC-FDMA (Clustered-Single Carrier-Frequency Division Multiple Access, also referred to as DFT-S-OFDM with Spectrum Division Control and DFT-precoded OFDM) scheme. Herein, the SC-FDMA scheme and Clustered-SC-FDMA scheme, which are proposed as the uplink communication scheme in LTE and LTE-A, have characteristics that it is possible to control the PAPR (Peak to Average Power Ratio, transmit power) in transmitting data (information) to within low levels, due to performance (single-carrier performance) of single-carrier communication scheme.

Further, in LTE-A, in contrast to general mobile communication systems in which used frequency bands are contiguous, it is considered to use a plurality of contiguous and/or non-contiguous frequency bands (hereinafter, also referred to as "component carriers (CCs)" or "carrier components (CCs)") in a complex manner to operate as a single wideband frequency band (also referred to as carrier aggregation). Further, in order for a base station apparatus and a mobile station apparatus to communicate using wideband frequency bands more flexibly, it is also proposed to set different frequency bandwidths on a frequency band used in communications in downlink and a frequency band used in communications in uplink (Asymmetric carrier aggregation) (Non-patent Document 1).

FIG. 9 is a diagram to explain a mobile communication system subjected to carrier aggregation in conventional techniques. Setting the same bandwidth on a frequency band used in communications in downlink (DL) and a frequency band used in communications in uplink (UL) as shown in FIG. 9 is also referred to as Symmetric carrier aggregation. As shown in FIG. 9, the base station apparatus and mobile station apparatus use a plurality of component carriers that are contiguous and/or non-contiguous frequency bands in a complex manner, and are capable of performing communications in a wideband frequency band comprised of a plurality of component carriers.

As an example, FIG. 9 shows that the frequency band (that may be the DL system band (width)) with a bandwidth of 100 MHz used in communications in downlink is comprised of five downlink component carriers (DCC1: Downlink Component Carrier 1, DCC2, DCC3, DCC4, and DCC5) each with a frequency bandwidth of 20 MHz. Further, as an example, FIG. 9 shows that the frequency band (that may be the UL system band (width)) with a bandwidth of 100 MHz used in communications in uplink is comprised of five uplink component carriers (UCC1: Uplink Component Carrier 1, UCC2, UCC3, UCC4, and UCC5) each with a frequency bandwidth of 20 MHz.

In FIG. 9, downlink channels of Physical Downlink Control Channel (hereinafter, PDCCH), Physical Downlink Shared Channel (hereinafter, PDSCH) and the like are allocated to each downlink component carrier.

The base station apparatus allocates (schedules) downlink control information (DCI) to transmit a downlink transport block to be transmitted using the PDSCH to a mobile station apparatus using the PDCCH, and transmits the downlink transport block to the mobile station apparatus using the PDSCH. Herein, in FIG. 9, the base station apparatus is capable of transmitting maximum five downlink transport blocks (that may be PDSCHs) to the mobile station apparatus in the same subframe.

Meanwhile, uplink channels of Physical Uplink Control Channel (hereinafter, PUCCH), Physical Uplink Shared Channel (hereinafter, PUSCH) and the like are allocated to each uplink component carrier.

The mobile station apparatus transmits uplink control information (UCI) including channel state information (CSI) indicative of a channel state in downlink, information indicative of ACK/NACK (Positive Acknowledgement/Negative Acknowledgment) in HARQ in response to the downlink transport block, scheduling request and the like to the base station apparatus using the PUCCH and/or PUSCH. Herein, in FIG. 9, the mobile station apparatus is capable of transmitting maximum five uplink transport blocks (that may be PUSCHs) to the base station apparatus in the same subframe.

Similarly, FIG. 10 is a diagram to explain a mobile communication system subjected to asymmetric carrier aggregation in the conventional techniques. As shown in FIG. 10, different bandwidths are set on a frequency band used in communications in downlink and a frequency band used in communications in uplink, and the base station apparatus and mobile station apparatus use component carriers that are contiguous and/or non-contiguous frequency bands constituting the frequency bands in a complex manner, and are capable of performing communications in wideband frequency bands.

As an example, FIG. 10 shows that the frequency band with a bandwidth of 100 MHz used in communications in downlink is comprised of five downlink component carriers (DCC1, DCC2, DCC3, DCC4, and DCC5) each with a frequency band of 20 MHz, and that the frequency band with a bandwidth of 40 MHz used in communications in uplink is comprised of two uplink component carriers (UCC1 and UCC2) each with a frequency band of 20 MHz.

In FIG. 10, downlink and uplink channels are respectively allocated to downlink and uplink component carriers, and the base station apparatus assigns (schedules) the PDSCH to the mobile station apparatus using the PDCCH, and transmits a downlink transport block to the mobile station apparatus using the PDSCH. Herein, in FIG. 10, the base station apparatus is capable of transmitting maximum five downlink transport blocks (that may be PDSCHs) to the mobile station apparatus in the same subframe.

Meanwhile, the mobile station apparatus transmits the uplink control information including the channel state information, information indicative of ACK/NACK in HARQ in response to the downlink transport block, scheduling request and the like to the base station apparatus using the PUCCH and/or PUSCH. Herein, in FIG. 10, the mobile station apparatus is capable of transmitting maximum two uplink transport blocks (that may be PUSCHs) to the base station apparatus in the same subframe.

Further, in LTE-A, in order for the base station apparatus to measure a channel in uplink, it is studied that the mobile station apparatus transmits a reference signal (hereinafter, also referred to as a Sounding Reference Signal SRS) to the base station apparatus using uplink. Based on the SRS transmitted from the mobile station apparatus, the base station apparatus schedules the mobile station apparatus, and for example, makes determination of allocation of PUSCH resources, modulation scheme and coding rate applied to the PUSCH and the like.

In regard to transmission of SRS by the mobile station apparatus, it is studied that the base station apparatus instructs (requests, triggers) the mobile station apparatus to transmit an aperiodic SRS (hereinafter, also referred to as A-SRS: Aperiodic SRS, Dynamic SRS, or Scheduled SRS) in addition to transmission of periodic SRS (hereinafter, also referred to as P-SRS: Periodic SRS). For example, it is proposed that the base station apparatus instructs the mobile station apparatus to transmit the A-SRS using a downlink control information format for downlink (also referred to as DCI format, downlink grant, or downlink assignment) (Non-patent Document 2). Further, for example, it is proposed that the base station apparatus instructs the mobile station apparatus to transmit the A-SRS using a downlink control information format for uplink (also referred to as DCI format, uplink grant: UL grant or uplink assignment) (Non-patent Document 3).

PRIOR ART DOCUMENT

Non-Patent Document

Non-patent Document 1: "Carrier aggregation in LTE-Advanced", 3GPP TSG RAN WG 1 Meeting #53bis, R1-082464, Jun. 30-Jul. 4, 2008.
Non-patent Document 2: "Aperiodic SRS for LTE-A", 3GPP TSG RAN WG 1 Meeting #60bis, R1-102114, Apr. 12-16, 2010.
Non-patent Document 3: "Further Details on SRS for Release 10", 3GPP TSG RAN WG 1 Meeting #60bis, R1-0101746, Apr. 12-16, 2010.

DISCLOSURE OF INVENTION

Problems to be Solved by the Invention

However, in the conventional techniques, any transmission method has not been clarified for a mobile station apparatus to transmit the A-SRS to a base station apparatus when the base station apparatus notifies the mobile station apparatus of a plurality of downlink control information formats (hereinafter, DCI formats) in the same subframe. Further, any transmission method has not been clarified for a mobile station apparatus to transmit the A-SRS when a base station apparatus notifies the mobile station apparatus of a plurality of DCI formats for some particular time period. Herein, for example, some particular time period indicates a time period between the next subframe after the mobile station apparatus transmits the SRS to the base station apparatus and a subframe in which the mobile station apparatus transmits the SRS again to the base station apparatus.

In other words, in the conventional techniques, since any A-SRS transmission method by a mobile station apparatus has not been clarified when the base station apparatus notifies the mobile station apparatus of a plurality of DCI formats in the same subframe and/or for some particular time period, it is uncertain whether the mobile station apparatus transmits the A-SRS to the base station apparatus. For example, when the base station apparatus notifies the mobile station apparatus of a DCI format including A-SRS transmission instructions and a parameter (hereinafter, referred to as the parameter) of A-SRS and a DCI format that does not give instructions for transmission of A-SRS in the same subframe and/or for some particular time period, it is uncertain whether the mobile station apparatus transmits the A-SRS to the base station apparatus.

In other words, since it is uncertain whether the mobile station apparatus transmits the A-SRS when the base station apparatus notifies the mobile station apparatus of a plurality of DCI formats in the same subframe and/or for some particular time period, there is the problem that the base station apparatus is not able to perform efficient scheduling.

The present invention was made in view of such circumstances, and it is an object to the invention to provide a mobile communication system, base station apparatus, mobile station apparatus and communication method for enabling a base station apparatus to perform efficient scheduling when the base station apparatus notifies a mobile station apparatus of a plurality of DCI formats in the same subframe and/or for some particular time period.

Means for Solving the Problem (1) To attain the aforementioned object, the invention took measures as described below. In other words, a mobile communication system of the invention is a mobile communication system comprised of a base station apparatus and a mobile station apparatus, and is characterized in that the base station apparatus notifies the mobile station apparatus of a plurality of downlink control information formats including at least one downlink control information format including instructions for transmission of a sounding reference signal and a parameter in the same subframe, and that the mobile station apparatus transmits a sounding reference signal set based on the parameter to the base station apparatus when among the plurality of downlink control information formats, a predetermined downlink control information format includes instructions for transmission of a sounding reference signal and the parameter.

(2) Further, a mobile communication system of the invention is a mobile communication system comprised of a base station apparatus and a mobile station apparatus, and is characterized in that the base station apparatus notifies the mobile station apparatus of a plurality of downlink control information formats in the same subframe, and that the mobile station apparatus transmits a sounding reference signal set based on a parameter notified by a predetermined subframe to the base station apparatus when all the plurality of downlink control information formats includes instructions for transmission of a sounding reference signal and a parameter.

(3) Furthermore, a mobile communication system of the invention is a mobile communication system comprised of a base station apparatus and a mobile station apparatus, and is characterized in that the base station apparatus notifies the mobile station apparatus of a plurality of downlink control information formats including at least one downlink control information format including instructions for transmission of a sounding reference signal and a parameter for some particular time period, and that the mobile station apparatus transmits a sounding reference signal set based on the parameter to the base station apparatus when among the plurality of downlink control information formats, a predetermined downlink control information format includes instructions for transmission of a sounding reference signal and the parameter.

(4) Still furthermore, a mobile communication system of the invention is a mobile communication system comprised of a base station apparatus and a mobile station apparatus, and is characterized in that the base station apparatus notifies the mobile station apparatus of a plurality of downlink control information formats including at least one downlink control information format including instructions for transmission of a sounding reference signal and a parameter for some particular time period, and that the mobile station apparatus transmits a sounding reference signal set based on the parameter to the base station apparatus when instructions for transmission of a sounding reference signal and the parameter are included in a downlink control information format notified in a subframe nearest a subframe a predetermined number of subframes before a subframe to transmit the sounding reference signal.

(5) Moreover, a mobile communication system of the invention is a mobile communication system comprised of a base station apparatus and a mobile station apparatus, and is characterized in that the base station apparatus notifies the mobile station apparatus of a plurality of downlink control information formats for some particular time period, and that the mobile station apparatus transmits a sounding reference signal set based on a parameter notified by a predetermined subframe to the base station apparatus when all the plurality of downlink control information formats includes instructions for transmission of a sounding reference signal and a parameter.

(6) Further, in the mobile communication system of the invention, it is a feature that the downlink control information format including the instructions for transmission of a sounding reference signal and the parameter is allocated to a mobile station apparatus specific search space.

(7) Furthermore, in the mobile communication system of the invention, it is a feature that the downlink control information format including the instructions for transmission of a sounding reference signal and the parameter is allocated to a common search space.

(8) Further, a base station apparatus of the invention is a base station apparatus in a mobile communication system comprised of the base station apparatus and a mobile station apparatus, and is characterized by having means for notifying the mobile station apparatus of a plurality of downlink control information formats including at least one downlink control information format including instructions for transmission of a sounding reference signal and a parameter in the same subframe, and means for receiving a sounding reference signal set based on the parameter from the mobile station apparatus when among the plurality of downlink control information formats, a predetermined downlink control information format includes instructions for transmission of a sounding reference signal and the parameter.

(9) Furthermore, a base station apparatus of the invention is a base station apparatus in a mobile communication system comprised of the base station apparatus and a mobile station apparatus, and is characterized by having means for notifying the mobile station apparatus of a plurality of downlink control information formats including at least one downlink control information format including instructions for transmission of a sounding reference signal and a parameter for some particular time period, and means for receiving a sounding reference signal set based on the parameter from the mobile station apparatus when among the plurality of downlink control information formats, a predetermined downlink control information format includes instructions for transmission of a sounding reference signal and the parameter.

(10) Further, a mobile station apparatus of the invention is a mobile station apparatus in a mobile communication system comprised of a base station apparatus and the mobile station apparatus, and is characterized by having means for being notified of a plurality of downlink control information formats including at least one downlink control information format including instructions for transmission of a sounding reference signal and a parameter in the same subframe from the base station apparatus, and means for transmitting a sounding reference signal set based on the parameter to the base station apparatus when among the plurality of downlink control information formats, a predetermined downlink control information format includes instructions for transmission of a sounding reference signal and the parameter.

(11) Furthermore, a mobile station apparatus of the invention is a mobile station apparatus in a mobile communication system comprised of a base station apparatus and the mobile station apparatus, and is characterized by having means for being notified of a plurality of downlink control information formats including at least one downlink control information format including instructions for transmission of a sounding reference signal and a parameter from the base station apparatus for some particular time period, and means for transmitting a sounding reference signal set based on the parameter to the base station apparatus when among the plurality of downlink control information formats, a predetermined downlink control information format includes instructions for transmission of a sounding reference signal and the parameter.

(12) Further, a communication method of the invention is a communication method in a base station apparatus in a mobile communication system comprised of the base station apparatus and a mobile station apparatus, and is characterized by notifying the mobile station apparatus of a plurality of downlink control information formats including at least one downlink control information format including instructions for transmission of a sounding reference signal and a parameter in the same subframe, and receiving a sounding reference signal set based on the parameter from the mobile station apparatus when among the plurality of downlink control information formats, a predetermined downlink control information format includes instructions for transmission of a sounding reference signal and the parameter.

(13) Furthermore, a communication method of the invention is a communication method in a base station apparatus in a mobile communication system comprised of the base station apparatus and a mobile station apparatus, and is characterized by notifying the mobile station apparatus of a plurality of downlink control information formats including at least one downlink control information format including instructions for transmission of a sounding reference signal and a parameter for some particular time period, and receiving a sounding reference signal set based on the parameter from the mobile station apparatus when among the plurality of downlink control information formats, a predetermined downlink control information format includes instructions for transmission of a sounding reference signal and the parameter.

(14) Further, a communication method of the invention is a communication method in a mobile station apparatus in a mobile communication system comprised of a base station apparatus and the mobile station apparatus, and is characterized by being notified of a plurality of downlink control information formats including at least one downlink control information format including instructions for transmission of a sounding reference signal and a parameter in the same subframe from the base station apparatus, and transmitting a sounding reference signal set based on the parameter to the base station apparatus when among the plurality of downlink control information formats, a predetermined downlink control information format includes instructions for transmission of a sounding reference signal and the parameter.

(15) Furthermore, a communication method of the invention is a communication method in a mobile station apparatus in a mobile communication system comprised of a base station apparatus and the mobile station apparatus, and is characterized by being notified of a plurality of downlink control information formats including at least one downlink control information format including instructions for transmission of a sounding reference signal and a parameter from the base station apparatus for some particular time period, and transmitting a sounding reference signal set based on the parameter to the base station apparatus when among the plurality of downlink control information formats, a predetermined downlink control information format includes instructions for transmission of a sounding reference signal and the parameter.

Advantageous Effect of the Invention

According to the invention, when a base station apparatus notifies a mobile station apparatus of a plurality of downlink control information formats in the same subframe and/or for some particular time period, the base station apparatus is capable of performing efficient scheduling.

BEST MODE FOR CARRYING OUT THE INVENTION

Figure 1:
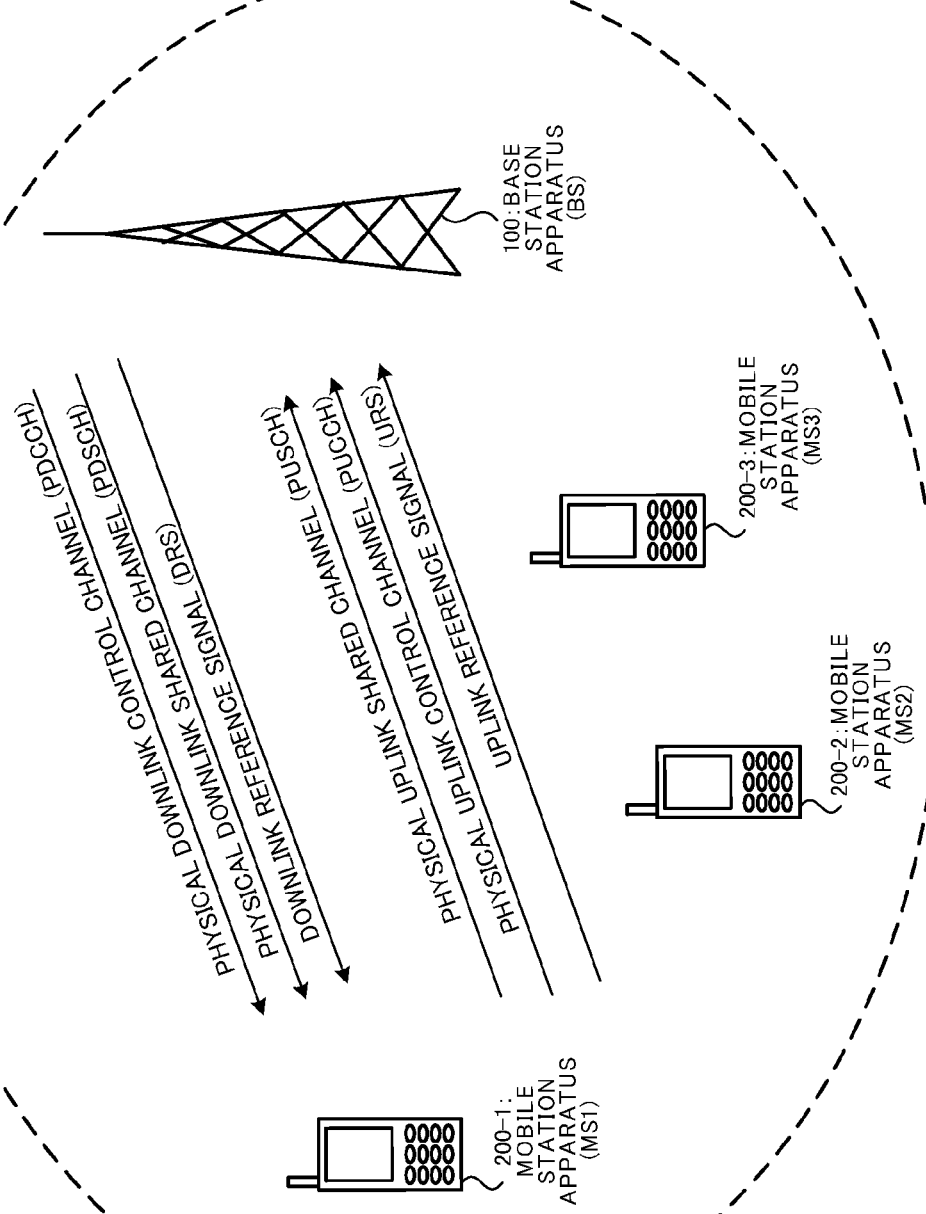
FIG. 1 is a diagram showing conceptually a configuration of physical channels according to Embodiments of the invention.

Embodiments according to the invention will be described next with reference to drawings. FIG. 1 is a diagram showing a configuration example of channels in Embodiments of the invention. Physical channels in downlink are comprised of Physical Downlink Control Channel (PDCCH) and Physical Downlink Shared Channel (PDSCH). Physical channels in uplink are comprised of Physical Uplink Shared Channel (PUSCH) and Physical Uplink Control Channel (PUCCH).

Further, a base station apparatus 100 transmits a downlink reference signal (also referred to as DRS: Downlink Reference Signal, downlink pilot signal or downlink pilot channel) to mobile station apparatuses 200-1, 200-2, 200-3 (mobile station apparatuses 200-1, 200-2, 200-3 are collectively represented as a mobile station apparatus 200.) Meanwhile, the mobile station apparatus 200 transmits an uplink reference signal (also referred to as URS: Uplink Reference Signal, uplink pilot signal or uplink pilot channel) to the base station apparatus 100. Herein, the uplink reference signal includes a demodulation reference signal (DRS) mainly used by the base station apparatus 100 to demodulate the PUCCH and/or PUSCH. Further, the uplink reference signal includes a sounding reference signal (SRS) mainly used by the base station apparatus 100 to estimate an uplink channel state.

The PDCCH is a channel used to notify (designate) the mobile station apparatus 200 of resource allocation of PDSCH, HARQ processing information related to downlink data, resource allocation of PUSCH, etc. The PDCCH is comprised of a plurality of control channel elements (CCEs), and the mobile station apparatus 200 detects a PDCCH comprised of CCEs, and thereby receives the PDCCH from the base station apparatus 100. The CCE is comprised of a plurality of resource element groups (also referred to as REG: Resource Element Groups, or mini-CCEs) dispersed in the frequency and time domains. Herein, the resource element is a unit resource comprised of one OFDM symbol (time component) and one subcarrier (frequency component).

Further, for downlink control information (DCI) transmitted on the PDCCH, a plurality of formats is defined. Hereinafter, the format of the downlink control information is referred to as a DCI format.

For example, as the DCI format for downlink, DCI format 1/1A is defined which is used when the base station apparatus 100 transmits the PDSCH using one transmission antenna port or a plurality of transmission antenna ports by a transmission diversity scheme. Further, for example, as the DCI format for downlink, DCI format 2 is defined which is used when the base station apparatus 100 transmits the PDSCH by SM (Spatial Multiplexing) using MIMO (Multiple Input Multiple Output). Herein, as the DCI format, it is possible to define a plurality of DCI formats having the same number of bits and a plurality of DCI formats having the different number of bits.

Meanwhile, for example, as the DCI format for uplink, DCI format 0 is defined which is used when the mobile station apparatus 200 transmits the PUSCH using one transmission antenna port. Further, for example, as the DCI format for uplink scheduling, DCI format 0A is prepared which is used when the mobile station apparatus 200 transmits the PUSCH by SM using MIMO.

Further, for example, as the DCI format, a DCI format used in group-scheduling for a plurality of mobile station apparatuses 200 is defined. For example, as the DCI formation, DCI format 3/3A is defined which includes a plurality of TPC commands (Transmission Power Control commands) for a plurality of mobile station apparatuses 200. For example, the base station apparatus notifies the mobile station apparatus 200 of an identifier and one index, and the mobile station apparatus 200 recognizes, as a TPC command for the apparatus 200, a TPC command associated with the index included in the DCI format 3/3A identified by the identifier notified from the base station apparatus 100.

Herein, the base station apparatus 100 is capable of notifying the mobile station apparatus of two indexes in order to identify whether the TPC command notified to the mobile station apparatus 200 using the DCI format 3/3A is a TPC command for the PUCCH or a TPC command for the PUSCH (that may be the PUSCH and SRS). In other words, the base station apparatus 100 is capable of notifying the mobile station apparatus 200 of one index for each of two identifiers. Herein, among two identifiers notified by the base station apparatus 100, an identifier applied to the DCI format including the TPC command for the PUCCH is also referred to as TPC-PUCCH-RNTI. Meanwhile, an identifier applied to the DCI format including the TPC command for the PUSCH (that may be the PUSCH and SRS) is also referred to as TPC-PUSCH-RNTI.

Further, the DCI format 3/3A used in group-scheduling for a plurality of mobile station apparatuses 200 needs to be received (detected) by the plurality of mobile station apparatuses 200, and therefore, is allocated to a common search space (also referred to as CSS: Common Search Space) in which all the mobile station apparatuses 200 try to search for (detect) the PDCCH. Herein, the PDCCH to some (particular) mobile station apparatus 200 is allocated to a mobile station apparatus specific search space (also referred to as USS: User equipment specific Search Space, UE specific Search Space) in which the some (particular) mobile station apparatus 200 tries to search for (detect) the PDCCH.

The base station apparatus 100 adds, to the DCI, a sequence obtained by scrambling a cyclic redundancy check (CRC) code generated based on the DCI with RNTI (Radio Network Temporary Identity) to transmit to the mobile station apparatus 200. The mobile station apparatus 200 changes interpretation of the DCI corresponding to which RNTI is used to scramble the cyclic redundancy check code. For example, when the cyclic redundancy check code is scrambled with C-RNTI (Cell-Radio Network Temporary Identity) assigned from the base station apparatus 100, the mobile station apparatus 200 determines that the DCI is DCI to the apparatus 200.

The PDCCH is subjected to coding (separate coding) separately for each mobile station apparatus 200 and for each type. In other words, the mobile station apparatus 200 detects a plurality of PDCCHs, and acquires downlink resource allocation, uplink resource allocation, and other control information. Each PDCCH is assigned a value of CRC enabling the format to be identified, and the mobile station apparatus 200 performs CRC on each set of CCEs having the possibility of constituting the PDCCH, and acquires the PDCCH that the CRC succeeds as the PDCCH to the apparatus 200. This is also referred to as blind decoding, and the range of sets of CCEs having the possibility of constituting the PDCCH in which the mobile station apparatus 200 performs blind decoding is referred to as a search space. In other words, the mobile station apparatus 200 performs blind decoding on CCEs within the search space, and detects the PDCCH to the apparatus 200.

When the PDCCH to the mobile station apparatus 200 includes resource allocation of PDSCH, the mobile station apparatus 200 receives a downlink signal (downlink data (transport block for the downlink shared channel (DL-SCH)) and/or downlink control data (downlink control information) and/or downlink reference signal (DRS)) using the PDSCH corresponding to resource allocation indicated by the PDCCH from the base station apparatus 100. In other words, the PDCCH is also regarded as a signal (hereinafter, also referred to as a "downlink transmission permission signal" or "downlink grant") to perform resource allocation for downlink.

Further, when the PDCCH to the mobile station apparatus 200 includes resource allocation of PDSCH, the mobile station apparatus 200 transmits an uplink signal (uplink data (transport block for the uplink shared channel (UL-SCH)) and/or uplink control data (uplink control information) and/or uplink reference signal (URS)) using the PUSCH corresponding to resource allocation indicated by the PDCCH from the base station apparatus 100. In other words, the PDCCH is also regarded as a signal (hereinafter, also referred to as an "uplink transmission permission signal" or "uplink grant") for permitting data transmission in uplink.

The PDSCH is a channel used to transmit downlink data (transport block for the downlink shared channel (DL-SCH) or paging information (Paging Channel: PCH)). Using the PDSCH assigned by the PDCCH, the base station apparatus 100 transmits the downlink transport block (transport block for the downlink shared channel (DL-SCH)) to the mobile station apparatus 200.

Herein, for example, the downlink data indicates the user data, and the DL-SCH is a transport channel. The DL-SCH supports HARQ and dynamic adaptive radio link control, and allows beam forming to be used. The DL-SCH supports dynamic resource allocation and quasi-static resource allocation.

The PUSCH is a channel mainly used to transmit uplink data (transport block for the uplink shared channel (UL-SCH)). Using the PUSCH assigned by the PDCCH transmitted from the base station apparatus 100, the mobile station apparatus 200 transmits the uplink transport block (transport block for the uplink shared channel (UL-SCH)) to the base station apparatus 100. Further, when the base station apparatus 100 schedules the mobile station apparatus 200, the uplink control information (UCI) is also transmitted using the PUSCH.

Herein, for example, the uplink data indicates user data, and the UL-SCH is a transport channel. Further, the PUSCH is a physical channel defined (configured) by the time domain and the frequency domain. The UL-SCH supports HARQ and dynamic adaptive radio link control, and allows beam forming to be used. The UL-SCH supports dynamic resource allocation and quasi-static resource allocation.

Herein, the uplink data (UL-SCH) and downlink data (DL-SCH) may include radio resource control signals (hereinafter, referred to as "RRC signaling: Radio Resource Control signaling") exchanged between the base station apparatus 100 and the mobile station apparatus 200. Further, the uplink data (UL-SCH) and downlink data (DL-SCH) may include MAC (Medium Access Control) elements exchanged between the base station apparatus 100 and the mobile station apparatus 200.

The base station apparatus 100 and the mobile station apparatus 200 transmit and receive RRC signaling in a higher layer (Radio Resource Control layer). Further, the base station apparatus 100 and the mobile station apparatus 200 transmit and receive MAC control elements in another higher layer (Medium Access Control (MAC) layer).

The PUCCH is a channel used to transmit uplink control information (UCI). Herein, the uplink control information includes channel state information (CSI), channel quality indicator (CQI), precoding matrix indicator (PMI), and rank indicator (RI). Further, the uplink control information includes information indicative of ACK/NACK in HARQ in response to the downlink transport block. Furthermore, the uplink control information includes a scheduling request (SR) for requesting resource allocation (requesting transmission on the UL-SCH) for the mobile station apparatus 200 to transmit uplink data.

[Configuration of the Base Station Apparatus 100]

Figure 2:
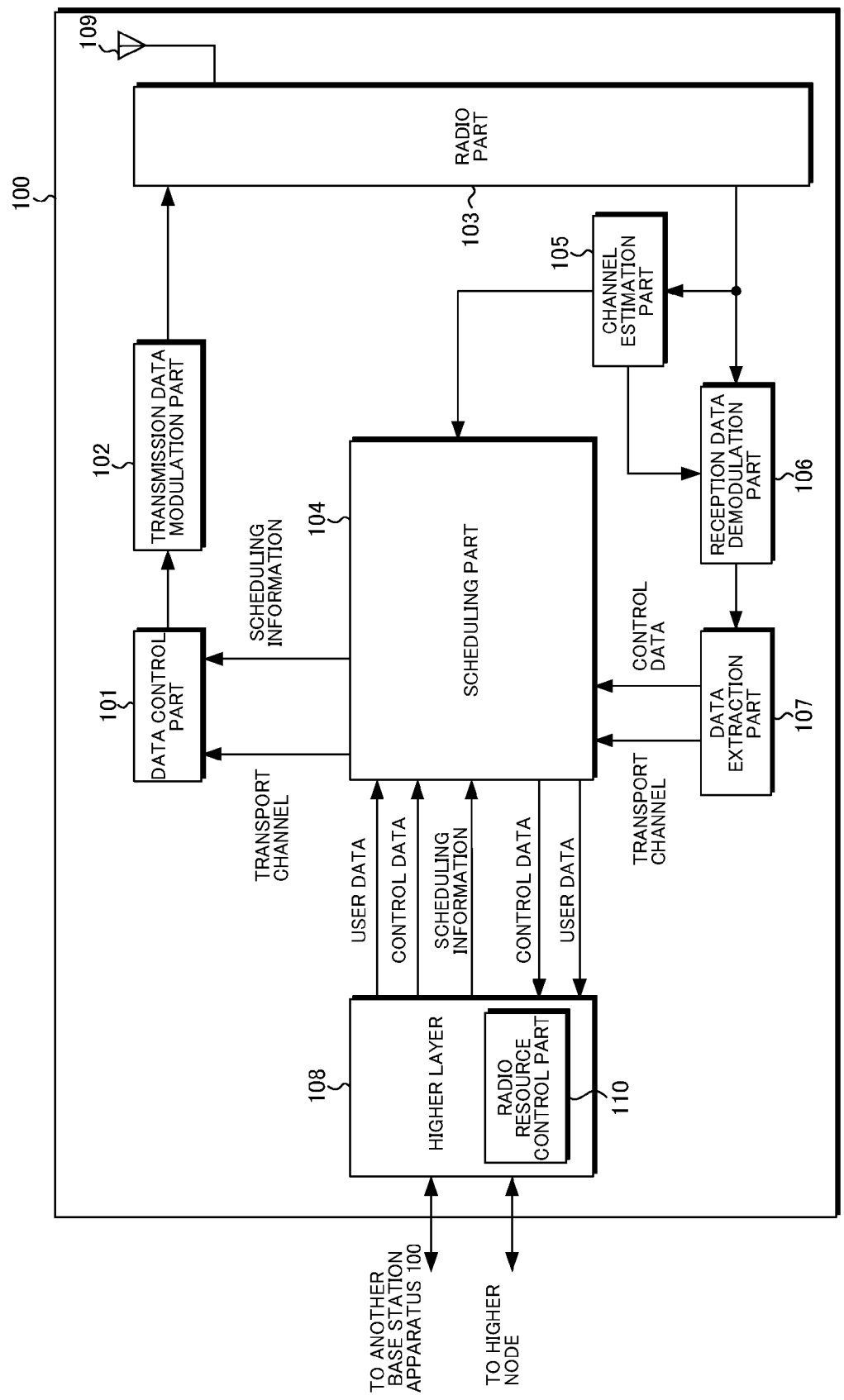
FIG. 2 is a block diagram illustrating a schematic configuration of a base station apparatus according to Embodiments of the invention.

FIG. 2 is a block diagram illustrating a schematic configuration of the base station apparatus 100 according to Embodiments of the invention. The base station apparatus 100 includes a data control part 101, transmission data modulation part 102, radio part 103, scheduling part 104, channel estimation part 105, reception data demodulation part 106, data extraction part 107, higher layer 108 and antenna 109, and is comprised thereof. Further, the radio part 103, scheduling part 104, channel estimation part 105, reception data demodulation part 106, data extraction part 107, higher layer 108 and antenna 109 constitute a reception part, and the data control part 101, transmission data modulation part 102, radio part 103, scheduling part 104, higher layer 108 and antenna 109 constitute a transmission part.

The antenna 109, radio part 103, channel estimation part 105, reception data demodulation part 106, and data extraction part 107 perform processing of the uplink physical layer. The antenna 109, radio part 103, transmission data modulation part 102 and data control part 101 perform processing of the downlink physical layer.

The data control part 101 receives a transport channel from the scheduling part 104. Based on scheduling information input from the scheduling part 104, the data control part 101 maps the transport channel, and signals and channels generated in the physical layer to physical channels. Each data mapped as described above is output to the transmission data modulation part 102.

The transmission data modulation part 102 modulates the transmission data to the OFDM scheme. Based on the scheduling information from the scheduling part 104, and the modulation scheme and coding scheme associated with each PRB, the transmission data modulation part 102 performs signal processing of data modulation, coding, serial/parallel transform of input signal, IFFT (Inverse Fast Fourier Transform) processing, CP (Cyclic Prefix) insertion, filtering and the like on the data input from the data control part 101, and generates transmission data to output to the radio part 103.

Herein, the scheduling information includes downlink physical resource block (PRB) assignment information, e.g. physical resource block position information comprised of frequency and time, and for example, the modulation scheme and coding scheme associated with each PRB include information of modulation scheme: 16QAM, coding rate: 2/3, etc.

The radio part 103 up-coverts the modulation data input from the transmission data modulation part 102 to generate a radio signal, and transmits the signal to the mobile station apparatus 200 via the antenna 109. Meanwhile, the radio part 103 receives an uplink radio signal from the mobile station apparatus 200 via the antenna 109, down-converts the signal into a baseband signal, and outputs reception data to the channel estimation part 105 and reception data demodulation part 106.

The scheduling part 104 performs processing of the Medium Access Control (MAC) layer. The scheduling part 104 performs mapping of logical channels and transport channels, scheduling (HARQ processing, selection of transport format, etc.) in downlink and uplink, and the like. In order for the scheduling part 104 to integrally control processing parts of respective physical layers, interfaces exist between the scheduling part 104 and the antenna 109, radio part 103, channel estimation part 105, reception data demodulation part 106, data control part 101, transmission data modulation part 102 and data extraction part 107 (although not shown).

In downlink scheduling, based on uplink signals (CSI, CQI, PMI, RI, information indicative of ACK/NACK in response to the downlink transport block, scheduling request, reference signal, etc.) received from the mobile station apparatus 200, information of usable PRB of each mobile station apparatus 200, buffer status, scheduling information input from the higher layer 108, etc., the scheduling part 104 performs processing for selecting the transport format (transmission form i.e. physical resource block assignment, modulation scheme, coding scheme, etc.) in downlink to modulate each data, retransmission control in HARQ, and generation of scheduling information used in downlink. The scheduling information used in scheduling in downlink is output to the data control part 101.

Meanwhile, in scheduling in uplink, based on an estimation result of uplink channel state (radio channel state) output from the channel estimation part 105, resource allocation request from the mobile station apparatus 200, information of usable PRB of each mobile station apparatus 200, scheduling information input from the higher layer 108, etc., the scheduling part 104 performs processing for selecting the transport format (transmission form i.e. physical resource block assignment, modulation scheme, coding scheme, etc.) in uplink to modulate each data, and generation of scheduling information used in scheduling in uplink. The scheduling information used in scheduling in uplink is output to the data control part 101.

Further, the scheduling part 104 maps the downlink logical channel input from the higher layer 108 to the transport channel to output to the data control part 101. Furthermore, the scheduling part 104 processes the control data and transport channel acquired in uplink input from the data extraction part 107, when necessary, and then, maps the resultant to the uplink logical channel to output to the higher layer 108.

For demodulation of uplink data, the channel estimation part 105 estimates an uplink channel state from a demodulation reference signal (DRS), and outputs the estimation result to the reception data demodulation part 106. Further, in order to perform scheduling in uplink, the part 105 estimates an uplink channel state from a sounding reference signal (SRS), and outputs the estimation result to the scheduling part 104.

The reception data demodulation part 106 also functions as an OFDM demodulation part for demodulating reception data modulated in the OFDM scheme and/or SC-FDMA scheme and/or a DFT-Spread-OFDM (DFT-S-OFDM) demodulation part. Based on the uplink channel state estimation result input from the channel estimation part 105, the reception data demodulation part 106 performs signal processing of DFT, subcarrier mapping, IFFT, filtering and the like on the modulation data input from the radio part 103, thereby performs demodulation processing, and outputs the resultant to the data extraction part 107.

The data extraction part 107 checks whether or not there is an error in the data input from the reception data demodulation part 106, and outputs the check result (ACK or NACK) to the scheduling part 104. Further, the data extraction part 107 divides the data input from the reception data demodulation part 106 into the transport channel and control data of physical layer to output to the scheduling part 104. The divided control data includes the CSI, CQI, PMI, RI, information indicative of ACK/NACK in response to the downlink transport block, scheduling request, etc. transmitted from the mobile station apparatus 200.

The higher layer 108 performs processing of Packet Data Convergence Protocol (PDCP) layer, Radio Link Control (RLC) layer, and Radio Resource Control (RRC) layer. In order for the higher layer 108 to integrally control processing parts of lower layers, interfaces exist between the higher layer 108 and the scheduling part 104, antenna 109, radio part 103, channel estimation part 105, reception data demodulation part 106, data control part 101, transmission data modulation part 102 and data extraction part 107 (although not shown).

The higher layer 108 has a radio resource control part 110 (also called the control part). Further, the radio resource control part 110 performs management of various kinds of setting information, management of system information, paging control, management of the communication state of each mobile station apparatus 200, moving management of handover, etc., management of buffer status for each mobile station apparatus 200, management of connection setting of unicast and multicast bearer, management of mobile station identifiers (UEIDs), etc. The higher layer 108 performs delivery and acceptance of information to another base station apparatus 100 and information to a higher node.

[Configuration of the Mobile Station Apparatus 200]

Figure 3:
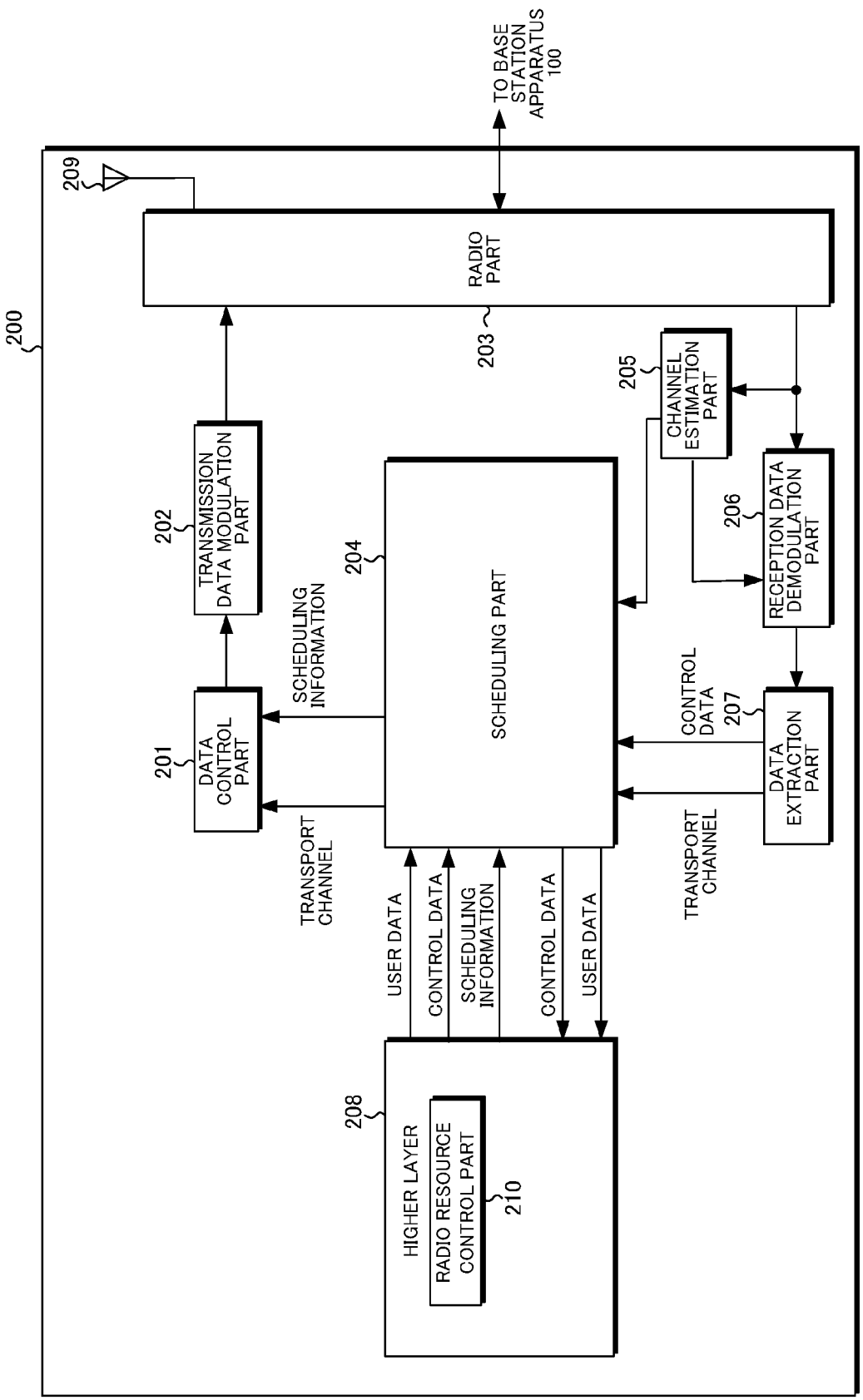
FIG. 3 is a block diagram illustrating a schematic configuration of a mobile station apparatus according to Embodiments of the invention.

FIG. 3 is a block diagram illustrating a schematic configuration of the mobile station apparatus 200 according to Embodiments of the invention. The mobile station apparatus 200 includes a data control part 201, transmission data modulation part 202, radio part 203, scheduling part 204, channel estimation part 205, reception data demodulation part 206, data extraction part 207, higher layer 208 and antenna 209, and is comprised thereof. Further, the data control part 201, transmission data modulation part 202, radio part 203, scheduling part 204, higher layer 208 and antenna 209 constitute a transmission part, and the radio part 203, scheduling part 204, channel estimation part 205, reception data demodulation part 206, data extraction part 207, higher layer 208 and antenna 209 constitute a reception part.

The data control part 201, transmission data modulation part 202, and radio part 203 perform processing of the uplink physical layer. The radio part 203, channel estimation part 205, reception data demodulation part 206, and data extraction part 207 perform processing of the downlink physical layer.

The data control part 201 receives a transport channel from the scheduling part 204. Based on scheduling information input from the scheduling part 204, the data control part 201 maps the transport channel, and signals and channels generated in the physical layer to physical channels. Each thus mapped data is output to the transmission data modulation part 202.

The transmission data modulation part 202 modulates the transmission data to the OFDM scheme and/or SC-FDMA scheme. The transmission data modulation part 202 performs signal processing of data modulation, DFT (Discrete Fourier Transform) processing, subcarrier mapping, IFFT (Inverse Fast Fourier Transform) processing, CP insertion, filtering and the like on the data input from the data control part 201, and generates transmission data to output to the radio part 203.

The radio part 203 up-coverts the modulation data input from the transmission data modulation part 202 to generate a radio signal, and transmits the signal to the base station apparatus 100 via the antenna 209. Meanwhile, the radio part 203 receives a radio signal modulated with downlink data from the base station apparatus 100 via the antenna 209, down-converts the signal into a baseband signal, and outputs reception data to the channel estimation part 205 and reception data demodulation part 206.

The scheduling part 204 performs processing of the Medium Access Control (MAC) layer. The scheduling part 204 performs mapping of logical channels and transport channels, scheduling (HARQ processing, selection of transport format, etc.) in downlink and uplink, and the like. In order for the scheduling part 204 to integrally control processing parts of respective physical layers, interfaces exist between the scheduling part 204 and the antenna 209, data control part 201, transmission data modulation part 202, channel estimation part 205, reception data demodulation part 206, data extraction part 207 and radio part 203 (although not shown).

In scheduling in downlink, based on the scheduling information (transport format and HARQ retransmission information) and the like from the base station apparatus 100 and higher layer 208, the scheduling part 204 performs reception control on transport channels, physical signals and physical channels, HARQ retransmission control, and generation of scheduling information used in scheduling in downlink. The scheduling information used in scheduling in downlink is output to the data control part 201.

In scheduling in uplink, based on uplink buffer status input from the higher layer 208, uplink scheduling information (transport format, HARQ retransmission information, etc.) from the base station apparatus 100 input from the data extraction part 207, scheduling information input from the higher layer 208, etc., the scheduling part 204 performs scheduling processing to map the uplink logical channel input from the higher layer 208 to the transport channel, and generation of scheduling information used in scheduling in uplink. In addition, for the uplink transport format, the part 204 uses information notified from the base station apparatus 100. The scheduling information is output to the data control part 201.

Further, the scheduling part 204 maps the uplink logical channel input from the higher layer 208 to the transport channel to output to the data control part 201. Furthermore, the scheduling part 204 also outputs, to the data control part 201, the CSI, CQI, PMI and RI input from the channel estimation part 205, and the check result of CRC input from the data extraction part 207. Still furthermore, the scheduling part 204 processes the control data and transport channel acquired in downlink input from the data extraction part 207, when necessary, and then, maps the resultant to the downlink logical channel to output to the higher layer 208.

For demodulation of downlink data, the channel estimation part 205 estimates a downlink channel state from a demodulation reference signal, and outputs the estimation result to the reception data demodulation part 206. Further, in order to notify the base station apparatus 100 of the estimation result of the downlink channel state (radio channel state, CSI, CQI, PMI, RI), the channel estimation part 205 estimates a downlink channel state from a downlink reference signal, and outputs the estimation result to the scheduling part 204, for example, as the CSI, CQI, PMI, and RI.

The reception data demodulation part 206 demodulates the reception data modulated in the OFDM scheme. Based on the downlink channel state estimation result input from the channel estimation part 205, the reception data demodulation part 206 performs demodulation processing on the modulation data input from the radio part 203 to output to the data extraction part 207.

The data extraction part 207 performs CRC on the data input from the reception data demodulation part 206 to check whether or not there is an error, and outputs the check result (information indicative of ACK or NACK) to the scheduling part 204. Further, the data extraction part 207 divides the data input from the reception data demodulation part 206 into the transport channel and control data of physical layer to output to the scheduling part 204. The divided control data includes scheduling information of resource allocation in downlink or uplink, HARQ control information in uplink, etc.

The higher layer 208 performs processing of Packet Data Convergence Protocol (PDCP) layer, Radio Link Control (RLC) layer, and Radio Resource Control (RRC) layer. In order for the higher layer 208 to integrally control processing parts of lower layers, interfaces exist between the higher layer 208 and the scheduling part 204, antenna 209, data control part 201, transmission data modulation part 202, channel estimation part 205, reception data demodulation part 206, data extraction part 207 and radio part 203 (although not shown).

The higher layer 208 has a radio resource control part 210 (also called the control part). The radio resource control part 210 performs management of various kinds of setting information, management of system information, paging control, management of the communication state of the mobile station 200, moving management of handover, etc., management of buffer status, management of connection setting of unicast and multicast bearer, and management of the mobile station identifier (UEID).

Embodiment 1

Described next is Embodiment 1 in a mobile communication system using the base station apparatus 100 and mobile station apparatus 200. In Embodiment 1, the base station apparatus 100 notifies the mobile station apparatus 200 of a plurality of DCI formats including at least one DCI format including instructions for transmission of SRS and a parameter in the same subframe, and when among the plurality of DCI formats, a predetermined DCI format includes instructions for transmission of SRS and the parameter, the mobile station apparatus 200 transmits the SRS to the base station apparatus 100. In other words, the base station apparatus 100 notifies the mobile station apparatus 200 of a plurality of DCI formats in the same subframe, and when among the plurality of DCI formats, at least one DCI format includes instructions for transmission of SRS and the parameter, the mobile station apparatus 200 transmits the SRS to the base station apparatus 100.

Further, the base station apparatus 100 notifies the mobile station apparatus 200 of a plurality of DCI formats in the same subframe, and when all the plurality of DCI formats includes instructions for transmission of SRS and a parameter, the mobile station apparatus 200 transmits the SRS set based on a parameter notified in a predetermined subframe and/or predetermined DCI format to the base station apparatus 100.

At this point, the mobile station apparatus 200 is capable of transmitting the SRS to base station apparatus 100 in a subframe a predetermined number of subframes after (for example, a subframe 4 subframes after) the subframe in which a plurality of DCI formats is notified from the base station apparatus 100. Meanwhile, the base station apparatus 100 is capable of setting a subframe for the mobile station apparatus 200 to transmit the SRS to the base station apparatus 100 on the mobile station apparatus 200 specifically for the cell. Further, the base station apparatus 100 is capable of setting a subframe for the mobile station apparatus 200 to transmit the SRS to the base station apparatus 100 on the mobile station apparatus 200 specifically for the mobile station apparatus. The mobile station apparatus 200 is capable of transmitting the SRS to the base station apparatus 100 in the subframe set by the base station apparatus 100.

Further, the base station apparatus 100 is capable of allocating the DCI format including instructions for transmission of SRS and a parameter to the mobile station apparatus specific search space (USS: UE Specific Search Space). Furthermore, the base station apparatus 100 is capable of including information of downlink scheduling in the DCI format including instructions for transmission of SRS and a parameter allocated to the USS to notify the mobile station apparatus 200. Still furthermore, the base station apparatus 100 is capable of including information of uplink scheduling in the DCI format including instructions for transmission of SRS and a parameter allocated to the USS to notify the mobile station apparatus 200.

Moreover, the base station apparatus 100 is capable of allocating the DCI format including instructions for transmission of SRS and a parameter to a common search space (CSS).

Hereinafter, in this Embodiment, the frequency band is defined using a bandwidth (Hz), but may be defined using the number of resource blocks (RBs) comprised of frequency and time. In other words, the bandwidth may be defined using the number of resource blocks. Further, the bandwidth and the number of resource blocks can be defined using the number of subcarriers.

The component carrier in this Embodiment indicates a (narrow-band) frequency band that is used in a complex manner when the base station apparatus 100 and mobile station apparatus 200 communicate with each other in a mobile communication system having a (wideband) frequency band (that may be a system band). The (wideband) frequency band (e.g. frequency band with a bandwidth of 100 MHz) is configured by aggregating a plurality of component carriers (e.g. five frequency bands each with a bandwidth of 20 MHz), and the base station apparatus 100 and mobile station apparatus 200 use the plurality of component carriers in a complex manner, and are thereby capable of achieving high-speed data communications (transmission and reception of information).

The component carrier indicates each of (narrow-band) frequency bands (e.g. frequency band with a bandwidth of 20 MHz) constituting the (wideband) frequency band (e.g. frequency band with a bandwidth of 100 MHz). Further, the component carrier may indicate the (center) carrier frequency of each of the (narrow-band) frequency bands.

In other words, a downlink component carrier has a band (bandwidth) of a part of usable frequency bands when the base station apparatus 100 and mobile station apparatus 200 transmit and receive downlink information, and an uplink component carrier has a band (bandwidth) of a part of usable frequency bands when the base station apparatus 100 and mobile station apparatus 200 transmit and receive uplink information. Further, the component carrier may be defined as a unit in which a particular physical channel (e.g. PDCCH, PUCCH, etc.) is configured.

Further, component carriers may be arranged in contiguous frequency bands, or may be arranged in non-contiguous frequency bands. A plurality of component carriers that are contiguous and/or non-contiguous frequency bands is aggregated to form a wideband frequency band, and the base station apparatus 100 and mobile station apparatus 200 use the plurality of component carriers in a complex manner, and are thereby capable of achieving high-speed data communications (transmission and reception of information).

Furthermore, it is not necessary that the frequency band used in communications of downlink comprised of component carriers and the frequency band used in communications of uplink comprised of component carriers have the same bandwidth, and the base station apparatus 100 and mobile station apparatus 200 are capable of performing communications, using the downlink frequency band and uplink frequency band with different bandwidths comprised of component carriers in a complex manner (asymmetric carrier aggregation as described above).

Figure 4:
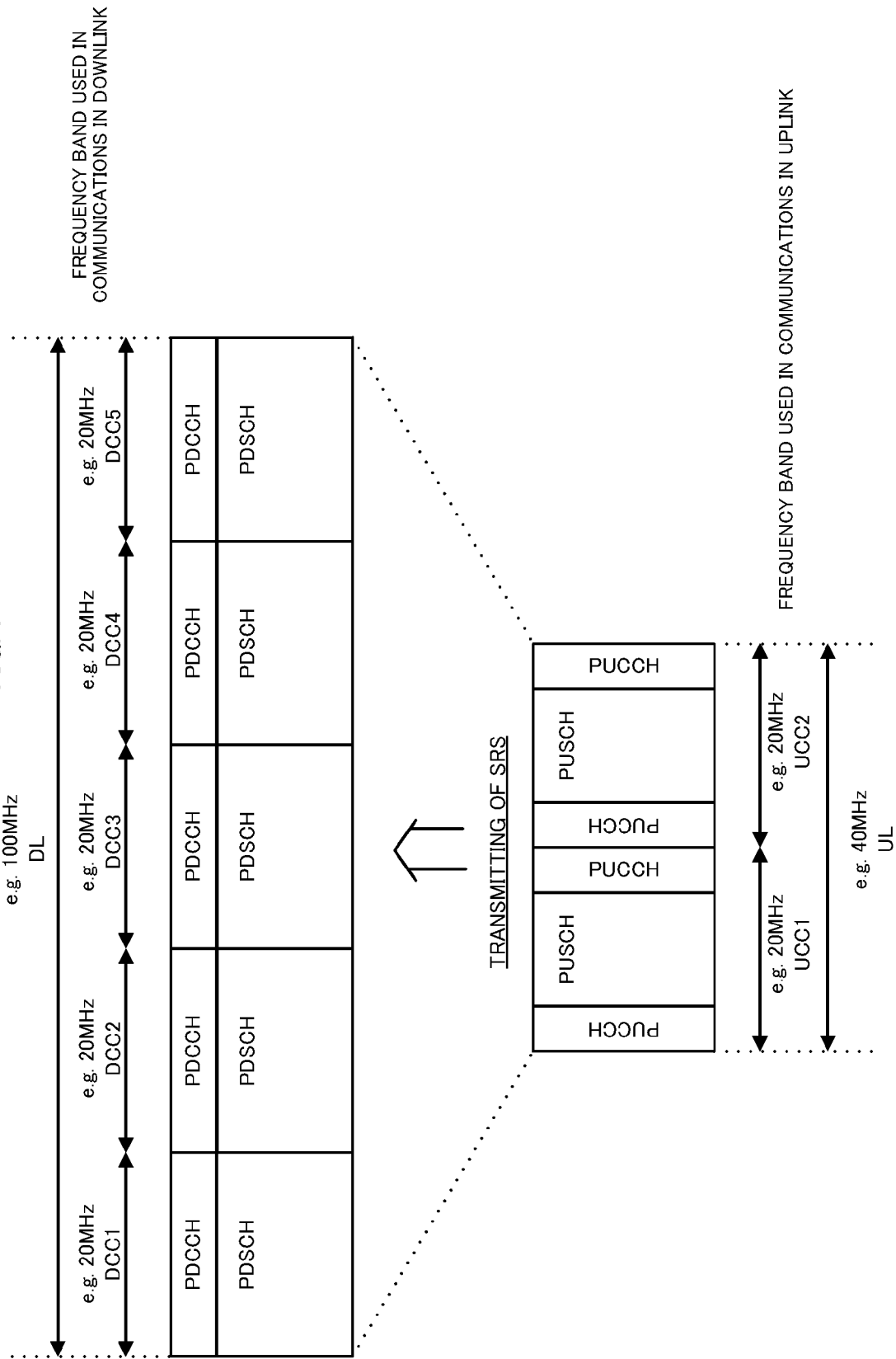
FIG. 4 is a diagram showing an example of a mobile communication system to which Embodiments of the invention are applicable.
Figure 10:
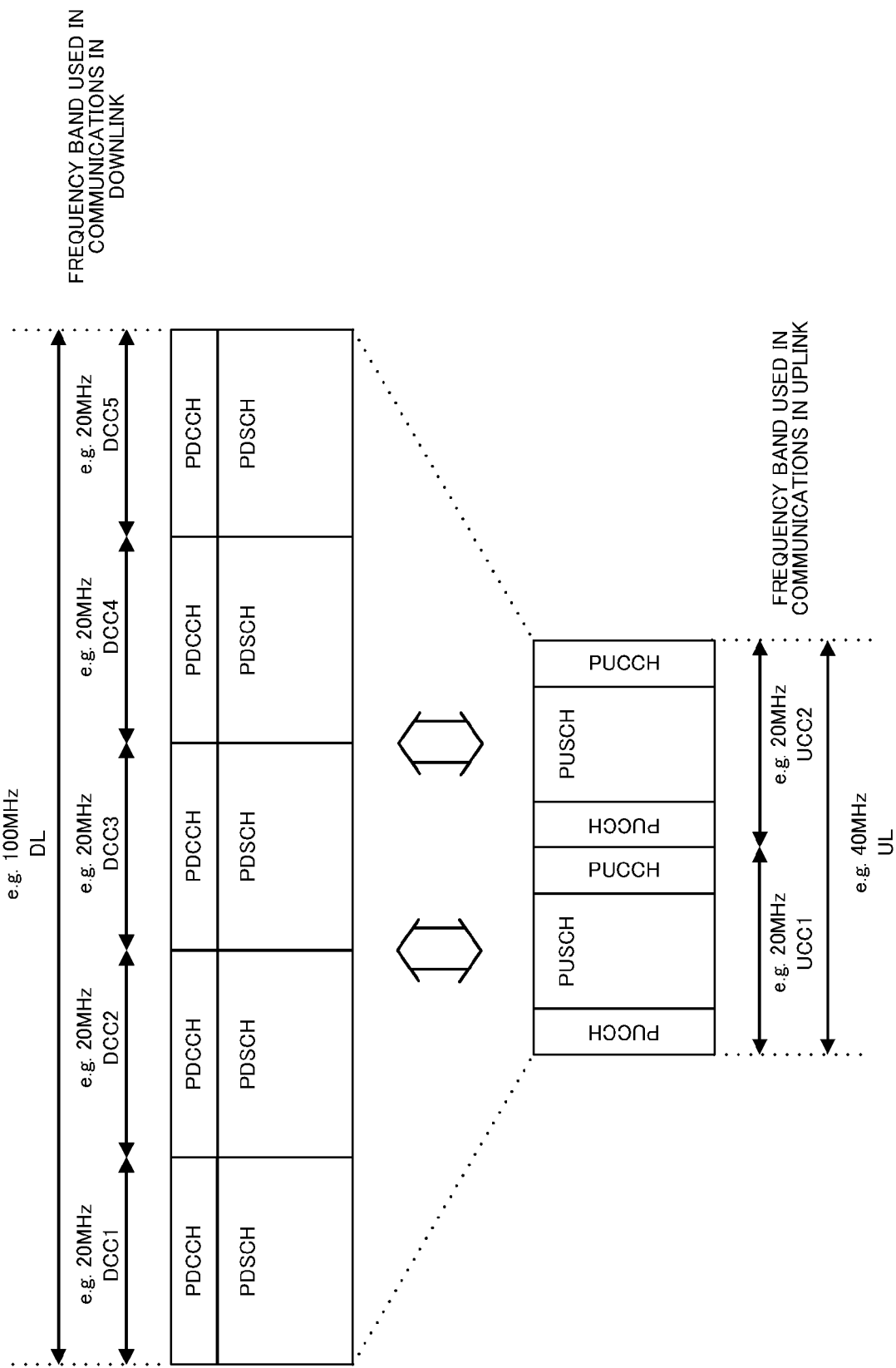
FIG. 10 is a diagram showing an example of asymmetric carrier aggregation in the conventional techniques.

FIG. 4 is a diagram showing an example of a mobile communication system to which Embodiment 1 is applicable. FIG. 4 shows a mobile communication system subjected to asymmetric carrier aggregation as shown in FIG. 10, as an example, but Embodiment 1 is applicable to both the mobile communication system subjected to symmetric carrier aggregation and the mobile communication system subjected to asymmetric carrier aggregation.

As an example, FIG. 4 shows that the frequency band with a bandwidth of 100 MHz used in communications in downlink is comprised of five downlink component carriers (DCC1, DCC2, DCC3, DCC4, and DCC5) each with a frequency bandwidth of 20 MHz. Further, FIG. 4 shows that the frequency band with a bandwidth of 40 MHz used in communications in uplink is comprised of two uplink component carriers (UCC1 and UCC2) each with a frequency bandwidth of 20 MHz.

In FIG. 4, downlink/uplink channels are respectively allocated to downlink/uplink component carriers, and the base station apparatus 100 allocates (schedules) the PDSCH to the mobile station apparatus 200 using the PDCCH, and transmits a downlink transport block to the mobile station apparatus 200 using the PDSCH. Herein, in FIG. 4, the base station apparatus 100 is capable of transmitting maximum five downlink transport blocks (that may be PDSCHs) to the mobile station apparatus 200 in the same subframe.

Meanwhile, the mobile station apparatus 200 transmits uplink control information including the channel state information, information indicative of ACK/NACK in HARQ in response to the downlink transport block, scheduling request and the like to the base station apparatus 100 using the PUCCH and/or PUSCH. Further, the mobile station apparatus 200 is capable of transmitting an uplink transport block to the base station apparatus 100 using the PUSCH assigned (scheduled) by the PDCCH from the base station apparatus 100. Herein, in FIG. 4, the mobile station apparatus 200 is capable of transmitting maximum two uplink transport blocks (that may be PUSCHs) to the base station apparatus 100 in the same subframe.

In FIG. 4, the base station apparatus 100 is capable of instructing the mobile station apparatus 200 to transmit a periodic SRS (P-SRS: Periodic SRS). For example, the base station apparatus 100 includes information indicative of an interval (transmission period) for the mobile station apparatus 200 to transmit the P-SRS in RRC signaling transmitted for each mobile station apparatus 200 to transmit to the mobile station apparatus 200, and is thereby capable of instructing the mobile station apparatus 200 to transmit the P-SRS.

The mobile station apparatus 200, which is instructed to transmit the P-SRS from the base station apparatus 100, transmits the P-SRS periodically. For example, the mobile station apparatus 200 transmits the P-SRS to the base station apparatus 100 according to the interval set by the base station apparatus 100.

Further, in FIG. 4, the base station apparatus 100 is capable of instructing the mobile station apparatus 200 to transmit an aperiodic SRS (A-SRS: Aperiodic SRS). For example, the base station apparatus 100 includes instructions for transmission of A-SRS and a parameter in a downlink control information format (DCI format, which may be the PDCCH) to transmit to the mobile station apparatus 200, and is thereby capable of instructing the mobile station apparatus 200 to transmit the A-SRS set based on the notified parameter.

For example, the base station apparatus 100 includes instructions for transmission of A-SRS and a parameter in a DCI format for downlink (also referred to as downlink grant, or downlink assignment) to transmit, and is thereby capable of instructing the mobile station apparatus 200 to transmit the A-SRS. In other words, using the DCI format 1/1A (that may be a DCI format similar to the DCI format 1/1A) as described above, the base station apparatus 100 is capable of instructing the mobile station apparatus 200 to transmit the A-SRS. Further, using the DCI format 2 (that may be a DCI format similar to the DCI format 2) as described above, the base station apparatus 100 is capable of instructing the mobile station apparatus 200 to transmit the A-SRS.

Hereinafter, for simplicity, the DCI format (that may be the DCI format 1/1A, a DCI format similar to the DCI format 1/1A, the DCI format 2 or a DCI format similar to the DCI format 2) for downlink is referred to as a DCI format A.

Herein, for example, the DCI format A is used by the base station apparatus 100 in scheduling the PDSCH. In other words, the DCI format A is used by the base station apparatus 100 in transmitting the PDSCH using one transmission antenna port. Further, the DCI format A is used by the base station apparatus 100 in transmitting the PDSCH using two transmission antenna ports (in addition, the number of transmission antenna ports may be two or more.) Furthermore, the DCI format A is used by the base station apparatus 100 in giving instructions concerning a random access procedure.

For example, information transmitted by the DCI format A includes resource allocation header information (Resource allocation header) indicative of a resource allocation type, resource allocation information (Resource block assignment) for the PDSCH, MCS information (Modulation and Coding Scheme) indicative of a modulation scheme and coding rate, information (HARQ process number) indicative of a process number of HARQ, information (New data indicator) to identify whether transmission data is new data, information (Redundancy version) indicative of a parameter for retransmission, and TPC command information (TPC command for PUCCH) for the PUCCH.

Furthermore, for example, the information transmitted by the DCI format A includes information (Flag for format differentiation) used in differentiation from the other DCI formats, information (Localized/Distributed VRB assignment flag) used in identification of a virtual resource block assignment method, information (Preamble Index, PRACH Mask Index) used in instructions concerning a random access procedure, and padding bit.

In other words, an information field to which these pieces of information (information bits) are mapped is defined in the DCI format A. In other words, the DCI format A includes the downlink scheduling information. Herein, the DCI format A includes information for downlink for some (particular) mobile station apparatus 200. In other words, the DCI format A is allocated to a mobile station apparatus specific search space (USS: UE specific Search Space) by the base station apparatus 100.

The base station apparatus 100 includes instructions for transmission of A-SRS and a parameter in the DCI format A to transmit to the mobile station apparatus 200, and is capable of instructing the mobile station apparatus 200 to transmit the A-SRS set based on the notified parameter. Herein, the instructions for transmission of A-SRS are capable of being actualized by defining an information field (for example, an information field of 1 bit) for instructions for transmission of A-SRS in the DCI format A.

Further, the instructions for transmission of A-SRS and/or the parameter is capable of being actualized by setting some particular information field (information) in the information field (information) included in the above-mentioned DCI format A at some particular value. For example, the instructions for transmission of A-SRS and/or the parameter is capable of being actualized by setting the Flag for format differentiation included in the DCI format A at "0", and further setting the Localized/Distributed VRB assignment flag at "1". Further, at this point, it is also possible to use the remaining information field (information field except some particular information field) included in the DCI format A as an information field (information field to which is mapped an A-SRS parameter used by the mobile station apparatus 200 in transmitting the A-SRS) for the mobile station apparatus 200 to transmit the A-SRS.

Herein, it is beforehand defined by specifications or the like setting which information field (which information) included in the DCI format A at which value indicates instructions for transmission of A-SRS and/or a parameter, and the definition is capable of being known between the base station apparatus 100 and the mobile station apparatus 200. It is also referred to as setting a code point on the DCI format thus setting some particular information field (information) included in the DCI format at some particular value to use for some use (for example, use for instructions for transmission of A-SRS and a parameter) (different from an original use (for example, downlink scheduling)).

The mobile station apparatus 200 recognizes whether the DCI format indicates downlink scheduling, for example, or transmission of A-SRS, corresponding to whether the beforehand defined information field is set at some particular value. Further, the mobile station apparatus 200 changes interpretation of the information field included in the DCI format, corresponding to whether the beforehand defined information field is set at some particular value. For example, when the beforehand defined information field is set at some particular value, the mobile station apparatus 200 changes the interpretation of the remaining information field to the information field to which is mapped an A-SRS parameter to transmit the A-SRS.

In other words, the base station apparatus 100 explicitly includes instructions for transmission of A-SRS and a parameter in the DCI format A to transmit to the mobile station apparatus 200 (for example, transmits information of 1 bit for indicating transmission of A-SRS to the mobile station apparatus 200), and is capable of instructing the mobile station apparatus 200 to transmit the A-SRS. Further, the base station apparatus 100 sets some particular information field included in the DCI format A at some particular value, thereby transmits instructions for transmission of A-SRS and a parameter to the mobile station apparatus 200, and is capable of instructing the mobile station apparatus 200 to transmit the A-SRS.

Further, for example, the base station apparatus 100 includes instructions for transmission of A-SRS and a parameter in a DCI format for uplink (also referred to as uplink grantor or uplink assignment) to transmit, and is thereby capable of instructing the mobile station apparatus 200 to transmit the A-SRS that enables the parameter to be dynamically changed. In other words, using the DCI format 0/0A (that may be a DCI format similar to the DCI format 0/0A) as described above, the base station apparatus 100 is capable of instructing the mobile station apparatus 200 to transmit the A-SRS. In other words, the base station apparatus 100 changes a parameter of A-SRS corresponding to a communication environment to enable efficient A-SRS transmission.

Hereinafter, for simplicity, the DCI format (that may be the DCI format 0/0A or a DCI format similar to the DCI format 0/0A) for uplink is referred to as a DCI format B.

Herein, for example, the DCI format B is used by the base station apparatus 100 to schedule the PUSCH. In other words, the DCI format B is used by the mobile station apparatus 200 to transmit the PUSCH using one transmission antenna port. Further, the DCI format B is used by the mobile station apparatus 200 to transmit the PUSCH using two transmission antenna ports (the number of transmission antenna ports may be two or more.)

For example, information transmitted by the DCI format B includes information (Flag for format differentiation) used in differentiation from the other DCI formats, information (Hopping flag) for indicating transmission with hopping, resource allocation information (Resource block assignment) for the PUSCH, information (Modulation and Coding Scheme and Redundancy version) indicative of a modulation scheme, coding rate and a parameter for retransmission, information (New data indicator) to identify whether transmission data is new data, TPC command information (TPC command for scheduled PUSCH) for the scheduled PUSCH, information (Cyclic shift for DM RS) indicative of a cyclic shift applied to a demodulation reference signal, CQI transmission request information (CQI request) and padding bit.

In other words, an information field to which these pieces of information (information bits) are mapped is defined in the DCI format B. In other words, the DCI format B includes the uplink scheduling information. Herein, the DCI format B includes uplink scheduling information for some (particular) mobile station apparatus 200. In other words, the DCI format B is allocated to a mobile station apparatus specific search space (USS: UE specific Search Space) by the base station apparatus 100.

The base station apparatus 100 includes instructions for transmission of A-SRS and a parameter in the DCI format B to transmit to the mobile station apparatus 200, and is capable of instructing the mobile station apparatus 200 to transmit the A-SRS. Herein, the instructions for transmission of A-SRS and a parameter are capable of being actualized by defining an information field (for example, an information field of 1 bit) for instructions for transmission of A-SRS and the parameter in the DCI format B.

Further, the instructions for transmission of A-SRS and the parameter are capable of being actualized by setting some particular information field (information) in the information field (information) included in the above-mentioned DCI format B at some particular value. For example, the instructions for transmission of A-SRS and the parameter are capable of being actualized by setting the Flag for format differentiation included in the DCI format B at "0", and further setting the Resource block assignment at "1". Further, at this point, it is also possible to use the remaining information field (information field except some particular information field) included in the DCI format B as an information field (information field to which is mapped an A-SRS parameter used by the mobile station apparatus 200 in transmitting the A-SRS) to transmit the A-SRS.

Herein, it is beforehand defined by specifications or the like setting which information field (which information) included in the DCI format B at which value indicates instructions for transmission of A-SRS and a parameter, and the definition is capable of being known between the base station apparatus 100 and the mobile station apparatus 200.

In other words, the base station apparatus 100 explicitly includes instructions for transmission of A-SRS and a parameter in the DCI format B to transmit to the mobile station apparatus 200 (for example, transmits information of 1 bit for indicating transmission of A-SRS to the mobile station apparatus 200), and is capable of instructing the mobile station apparatus 200 to transmit the A-SRS. Further, the base station apparatus 100 sets some particular information field included in the DCI format B at some particular value, thereby transmits instructions for transmission of A-SRS and the parameter to the mobile station apparatus 200, and is capable of instructing the mobile station apparatus 200 to transmit the A-SRS.

Further, for example, the base station apparatus 100 includes instructions for transmission of A-SRS and a parameter in a DCI format including a plurality of TPC commands for a plurality of mobile station apparatuses 200, and is thereby capable of instructing the mobile station apparatus 200 to transmit the A-SRS. In other words, using the DCI format 3/3A (that may be a DCI format similar to the DCI format 3/3A) as described above, the base station apparatus 100 is capable of instructing the mobile station apparatus 200 to transmit the A-SRS.

The mobile station apparatus 200, which is instructed to transmit the A-SRS from the base apparatus 100, transmits the A-SRS to the base station apparatus 100 non-periodically. For example, the mobile station apparatus 200 is capable of transmitting the A-SRS to the base station apparatus 100 in a subframe a predetermined number of subframes after (for example, a subframe 4 subframes after) the subframe in which the DCI format (that may be the PDCCH) including instructions for transmission of A-SRS and the parameter is notified from the base station apparatus 100.

Meanwhile, the base station apparatus 100 is capable of setting a subframe for the mobile station apparatus 200 to transmit the P-SRS on the mobile station apparatus 200 specifically for the cell (cell specific) and/or mobile station apparatus (UE specific). Further, the base station apparatus 100 is capable of setting a subframe for the mobile station apparatus 200 to transmit the A-SRS on the mobile station apparatus 200 specifically for the cell (cell specific) and/or mobile station apparatus (UE specific). Hereinafter, a subframe, set by the base station apparatus 100, for the mobile station apparatus 200 to transmit the P-SRS and/or A-SRS is also referred to as an SRS subframe.

For example, using the broadcast information (broadcast channel), the base station apparatus 100 is capable of setting the SRS subframe on the mobile station apparatus 200 specifically for the cell. Further, using RRC signaling, the base station apparatus 100 is capable of setting the SRS subframe on the mobile station apparatus 200 specifically for the mobile station apparatus. For example, the base station apparatus 100 is capable of setting the SRS subframe using an offset value from some subframe to be the reference and the period.

The mobile station apparatus 200 is capable of transmitting the P-SRS in an SRS subframe set by the base station apparatus 100. For example, the mobile station apparatus 200 transmits the P-SRS in the SRS subframe periodically, according to the interval set by the base station apparatus 100.

Further, the mobile station apparatus 200 is capable of transmitting the A-SRS in an SRS subframe set by the base station apparatus 100. For example, the mobile station apparatus 200 is capable of transmitting the A-SRS in a first SRS subframe after the subframe in which the DCI format including instructions for transmission of A-SRS and the parameter is notified from the base station apparatus 100. In other words, the mobile station apparatus 200 transmits the A-SRS in a first SRS subframe after detecting the DCI format including instructions for transmission of A-SRS and the parameter from the base station apparatus 100.

Meanwhile, the base station apparatus 100 is capable of setting a parameter (P-SRS parameter) used by the mobile station apparatus 200 in transmitting the P-SRS on the mobile station apparatus 200. For example, using RRC signaling, the base station apparatus 100 is capable of setting the P-SRS parameter on the mobile station apparatus 200. Further, for example, using the PDCCH, the base station apparatus 100 is capable of setting the P-SRS parameter on the mobile station apparatus 200.

Herein, the P-SRS parameter includes an interval (transmission period) for the mobile station apparatus 200 to transmit the P-SRS. Further, the P-SRS parameter includes a transmission bandwidth (SRS transmission bandwidth) for the mobile station apparatus 200 to transmit the P-SRS. Furthermore, the P-SRS parameter includes a cyclic shift (CS) used to maintain orthogonality between the mobile station apparatuses 200 or signals. Still furthermore, the P-SRS parameter includes information indicative of a frequency assignment position indicative of a frequency position to allocate the P-SRS. Moreover, the P-SRS parameter includes the number of transmissions or transmission halt time to cause transmission of P-SRS to expire. Further, the P-SRS parameter includes an antenna port (antenna index) for transmitting the P-SRS. Furthermore, the P-SRS parameter includes a plurality-of-antenna simultaneous transmission flag indicating whether or not to transmit the P-SRS simultaneously using a plurality of antennas as in MIMO. Still furthermore, the P-SRS parameter includes a TPC command (transmission power control command) for the P-SRS.

Meanwhile, the base station apparatus 100 is capable of setting a parameter (A-SRS parameter) used by the mobile station apparatus 200 in transmitting the A-SRS on the mobile station apparatus 200. For example, using RRC signaling, the base station apparatus 100 is capable of setting the A-SRS parameter on the mobile station apparatus 200. Further, for example, using the PDCCH, the base station apparatus 100 is capable of assigning the A-SRS parameter to the mobile station apparatus 200. Furthermore, as described above, the base station apparatus 100 sets a code point on the DCI format, and is thereby assigning the A-SRS parameter to the mobile station apparatus 200.

Herein, the A-SRS parameter includes a transmission bandwidth (SRS transmission bandwidth) for the mobile station apparatus 200 to transmit the A-SRS. Further, the A-SRS parameter includes a cyclic shift (CS) used to maintain orthogonality between the mobile station apparatuses 200 or signals. Furthermore, the A-SRS parameter includes information indicative of a frequency assignment position indicative of a frequency position to allocate the A-SRS. Still furthermore, the A-SRS parameter includes the number of transmissions or transmission halt time to cause transmission of A-SRS to expire. Moreover, the A-SRS parameter includes an antenna port (antenna index) for transmitting the A-SRS. Further, the A-SRS parameter includes a plurality-of-antenna simultaneous transmission flag indicating whether or not to transmit the A-SRS simultaneously using a plurality of antennas as in MIMO. Furthermore, the A-SRS parameter includes a TPC command (transmission power control command) for the A-SRS.

Herein, the A-SRS parameter may be set for each DCI format for indicating transmission of A-SRS. For example, it may be possible to set separately an A-SRS parameter used in the case where transmission of A-SRS is indicated by the DCI format A from the base station apparatus 100 and an A-SRS parameter used in the case where transmission of A-SRS is indicated by the DCI format B. The mobile station apparatus 200 switches the A-SRS parameter to use, corresponding to the DCI format including instructions for transmission of A-SRS and the parameter from the base station apparatus 100, and is capable of transmitting the A-SRS to the base station apparatus 100.

Figure 5:
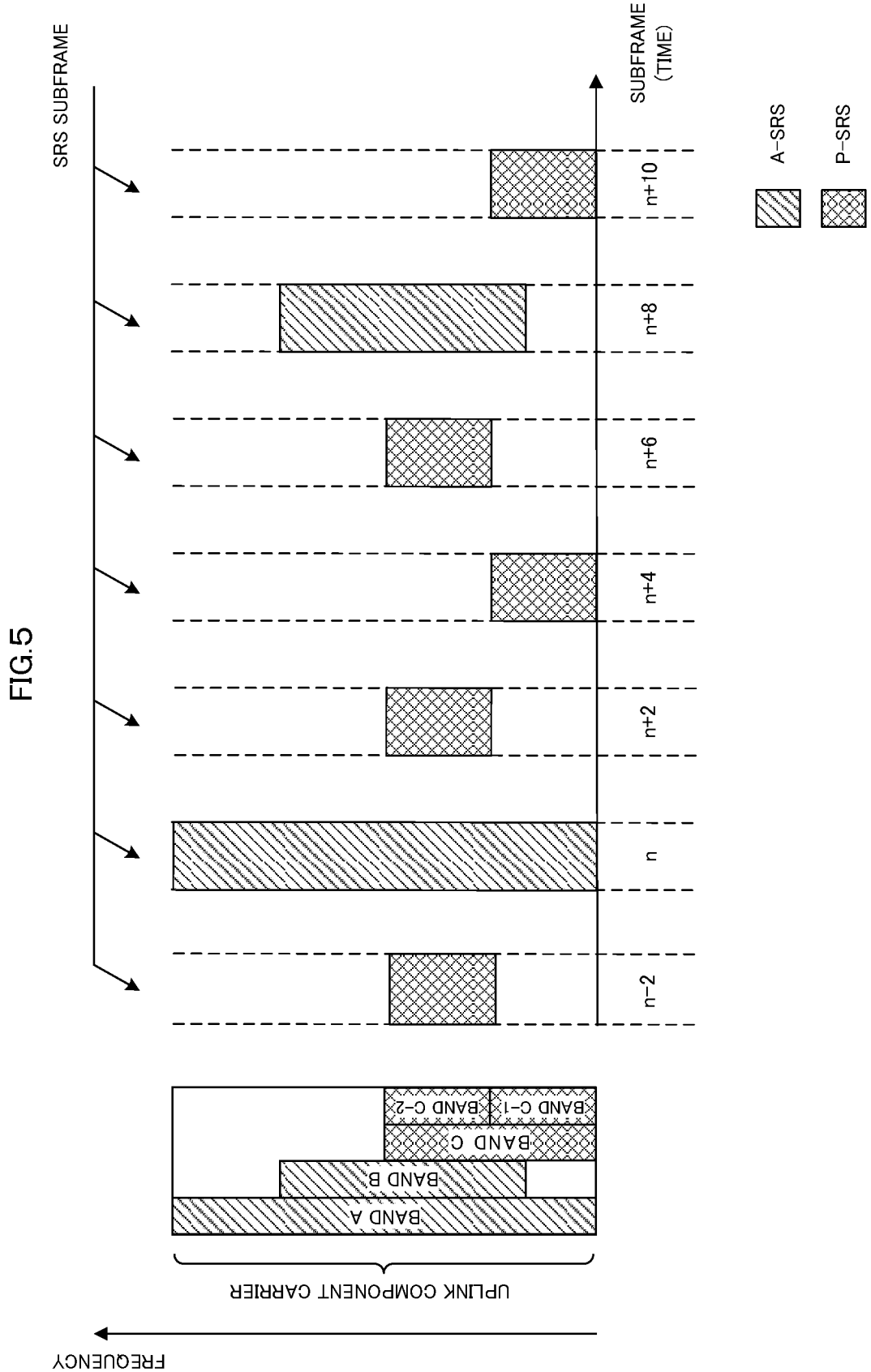
FIG. 5 is a diagram showing an example of transmission of SRS by the mobile station apparatus.

Further, the A-SRS parameter may be set as a common A-SRS parameter (single A-SRS parameter) while being not dependent on the DCI format for indicating transmission of A-SRS. When the mobile station apparatus 200 is notified of the DCI format including instructions for transmission of A-SRS and the parameter from the base station apparatus 100, the mobile station apparatus 200 is capable of transmitting the A-SRS to the base station apparatus 100 using a single A-SRS parameter while being not dependent on the DCI format (even when any DCI format indicates transmission of A-SRS). FIG. 5 is a diagram showing an example of SRS (P-SRS, A-SRS) transmission by the mobile station apparatus 200. In FIG. 5, the horizontal axis represents the subframe (time). Further, the vertical axis represents the frequency (frequency band). Herein, as an example, FIG. 5 shows transmission of SRS in one uplink component carrier by the mobile station apparatus 200.

As shown in FIG. 5, for example, the base station apparatus 100 instructs (sets) the mobile station apparatus 200 to transmit the SRS (P-SRS, A-SRS) for each uplink component, and according to instructions from the base station apparatus 100, the mobile station apparatus 200 is also capable of transmitting the SRS (P-SRS, A-SRS) to the base station apparatus 100 for each uplink component. In other words, the base station apparatus 100 is capable of setting the P-SRS parameter and/or A-SRS parameter on the mobile station apparatus 200 for each uplink component.

Herein, each SC-FDMA symbol for the mobile station apparatus 200 to map an uplink signal is used for a different use. For example, when the mobile station apparatus 200 maps an uplink signal to seven SC-FDMA symbols (7 SC-FDMA symbols of number 0 to number 6) to transmit to the base station apparatus 100, the SRS (P-SRS, A-SRS) is mapped to the sixth SC-FDMA symbol.

Hereinafter, for simplicity, it is described that the mobile station apparatus 200 transmits the SRS (P-SRS, A-SRS) to the base station apparatus 100 in a subframe, but the SRS (P-SRS, A-SRS) may be mapped to some SC-FDMA symbol in a subframe and transmitted to the base station apparatus 100. Further, transmission of P-SRS and transmission of A-SRS concurrently occurring (transmission of P-SRS and transmission of A-SRS colliding) as described below may indicate that transmission of P-SRS and transmission of A-SRS concurrently occurs (collides with each other) in a symbol level.

FIG. 5 shows that the base station apparatus 100 sets the mobile station apparatus 200 for subframe n−2, subframe n, subframe n+2, subframe n+4, subframe n+6, subframe n+8 and subframe n+10 as the SRS subframe. The mobile station apparatus 200 is capable of transmitting the SRS (P-SRS, A-SRS) to the base station apparatus 100 in the SRS subframes set by the base station apparatus 100.

Further, the mobile station apparatus 200 is capable of transmitting the A-SRS in a subframe a predetermined number of subframes after (for example, a subframe 4 subframes after) the subframe in which the DCI format including instructions for transmission of A-SRS and a parameter is notified from the base station apparatus 100. Furthermore, the mobile station apparatus 200 is capable of transmitting the A-SRS in a first SRS subframe (SRS transmittable subframe) after the subframe in which the DCI format (that may be the PDCCH) including instructions for transmission of A-SRS and a parameter is notified from the base station apparatus 100.

FIG. 5 shows that according to instructions from the base station apparatus 100, the mobile station apparatus 200 transmits P-SRSs (shown by mesh lines) to the base station apparatus 100 in the subframe n−2, subframe n+2, subframe n+4, subframe n+6 and subframe n+10. In other words, according to the interval (every two subframes, every 2 ms) set by the base station apparatus 100, the mobile station apparatus 200 transmits the P-SRS to the base station apparatus 100 periodically (every two subframes, every 2 ms).

Herein, according to the transmission bandwidth (SRS transmission bandwidth) set by the base station apparatus 100, the mobile station apparatus 200 transmits the P-SRS to the base station apparatus 100 in a band C−1 that is a part of a band C (that is a part of bands obtained by dividing the band C) in each of the subframes n+4 and n+10. Further, according to the transmission bandwidth (SRS transmission bandwidth) set by the base station apparatus 100, the mobile station apparatus 200 transmits the P-SRS to the base station apparatus 100 in a band C−2 that is another part of the band C (that is another part of bands obtained by dividing the band C) in each of the subframes n−2, n+2 and n+6. Herein, the order in which the mobile station apparatus 200 transmits the P-SRS in some band (band C−1, band C−2) is beforehand defined (or may be set by the base station apparatus 100). Further, the base station apparatus 100 is capable of setting the mobile station apparatus 200 to transmit the P-SRS only once.

Further, FIG. 5 shows that according to instructions from the base station apparatus 100, the mobile station apparatus 200 transmits A-SRSs (shown by oblique lines) to the base station apparatus 100 in the subframe n and subframe n+8.

Herein, according to the transmission bandwidth ((SRS transmission) bandwidth) set by the base station apparatus 100, the mobile station apparatus 200 transmits the A-SRS to the base station apparatus 100 in a band A in the subframe n. Further, according to the transmission bandwidth ((SRS transmission) bandwidth) set by the base station apparatus 100, the mobile station apparatus 200 transmits the A-SRS to the base station apparatus 100 in a band B in the subframe n+8.

Further, in FIG. 5, the subframes n and n+8 indicate subframes in which transmission of P-SRS and transmission of A-SRS concurrently occurs. In FIG. 5, when transmission of P-SRS and transmission of A-SRS concurrently occurs, the mobile station apparatus 200 is capable of not transmitting (dropping) the P-SRS to transmit the A-SRS to the base station apparatus 100. Herein, when transmission of P-SRS and transmission of A-SRS concurrently occurs, the mobile station apparatus 200 is also capable of multiplexing the P-SRS and the A-SRS to transmit to the base station apparatus 100. For example, when transmission of P-SRS and transmission of A-SRS concurrently occurs, the mobile station apparatus 200 is capable of code-multiplexing the P-SRS and the A-SRS to transmit to the base station apparatus 100.

Herein, in FIG. 5, as an example, the mobile station apparatus 200 transmits the SRS (P-SRS, A-SRS) in all SRS subframes set by the base station apparatus 100, but when the base station apparatus 100 does not give instructions for transmission of SRS, the mobile station apparatus 200 does not transmit the SRS. In other words, the mobile station apparatus 200 may not transmit the SRS in all SRS subframes set by the base station apparatus 100.

Figure 6:
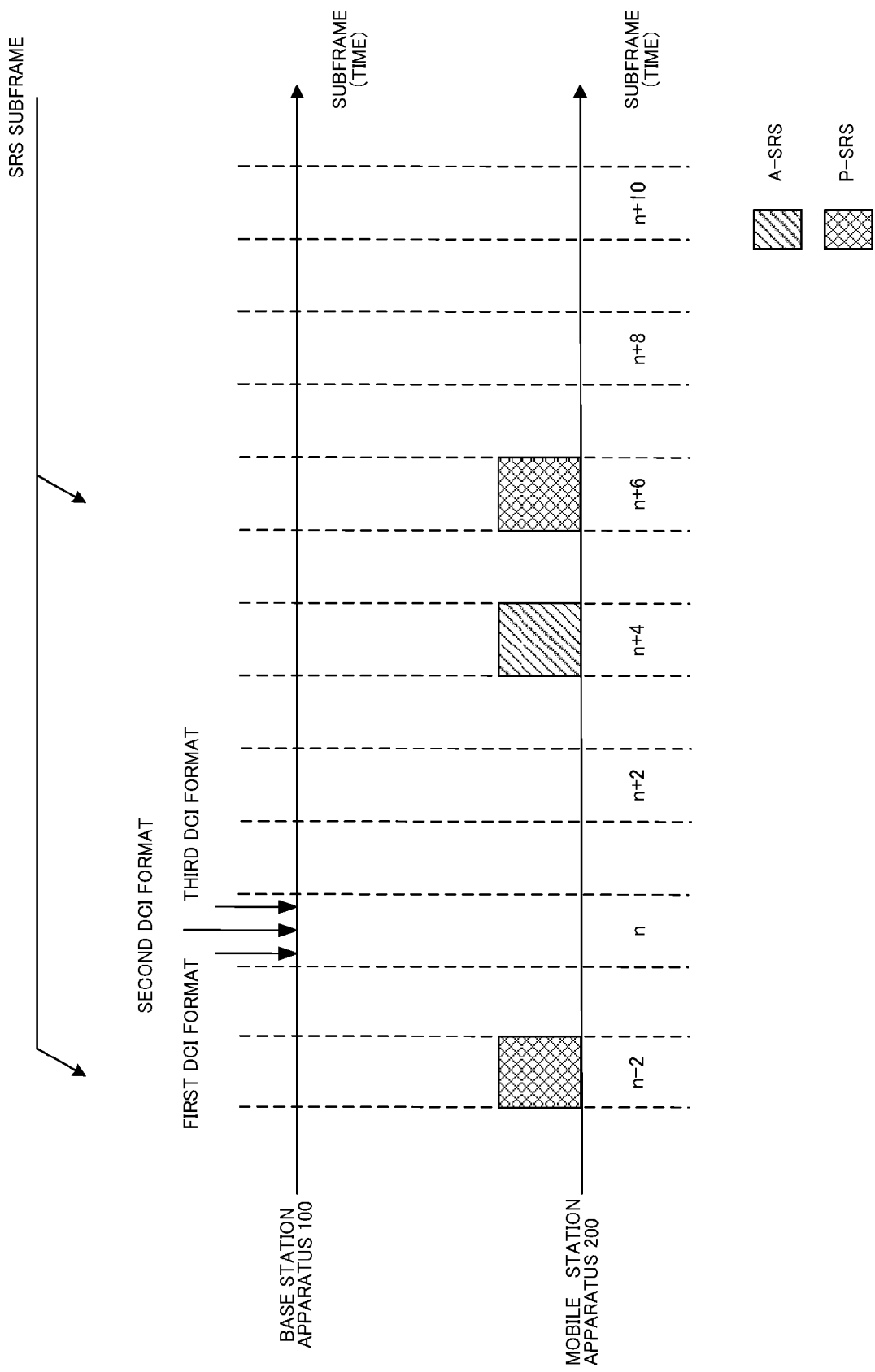
FIG. 6 is a diagram showing Example 1 of transmission of A-SRS by the mobile station apparatus.

FIG. 6 is a diagram showing an example of A-SRS transmission by the mobile station apparatus 200. In FIG. 6, the horizontal axis represents the subframe (time). Further, it is shown that the base station apparatus 100 sets the mobile station apparatus 200 for subframe n−2 and subframe n+6 as the SRS subframe. Further, it is shown that mobile station apparatus 200 transmits the P-SRS (shown by mesh lines) to the base station apparatus 100 in the subframe n−2 and subframe n+6 set by the base station apparatus 100. Furthermore, it is shown that that mobile station apparatus 200 transmits the A-SRS (shown by diagonal lines) in the subframe n+4.

In FIG. 6, the base station apparatus 100 is capable of notifying the mobile station apparatus 200 of a plurality of DCI formats including at least one DCI format including instructions for transmission of A-SRS and a parameter in the same subframe. In other words, the base station apparatus 100 is capable of notifying the mobile station apparatus 200 of a plurality of different DCI formats in the same subframe. FIG. 6 shows that the base station apparatus 100 notifies the mobile station apparatus 200 of a plurality of DCI formats (shown by the first DCI format, second DCI format and third DCI format) including at least one DCI format including instructions for transmission of A-SRS and a parameter in the subframe n.

Herein, in FIG. 6, as an example, the base station apparatus 10 notifies the mobile station apparatus 200 of three DCI formats in the same subframe, but it is natural that the number of DCI formats notified by the base station apparatus 100 in the same subframe is any number.

Herein, the DCI format that the base station apparatus 100 notifies the mobile station apparatus 200 includes the DCI format A and DCI format B as described above. Further, the DCI format that the base station apparatus 100 notifies the mobile station apparatus 200 includes the DCI format A including instructions for transmission of A-SRS and a parameter and DCI format B including instructions for transmission of A-SRS and a parameter as described above.

In FIG. 6, in the mobile station apparatus 200 notified of a plurality of DCI formats including at least one DCI format including instructions for transmission of A-SRS and a parameter from the base station apparatus 100 in the same subframe, when among the plurality of DCI formats a predetermined DCI format includes instructions for transmission of A-SRS and a parameter, the mobile station apparatus 200 is capable of transmitting the A-SRS to the base station apparatus 100. FIG. 6 shows that the mobile station apparatus 200 transmits the A-SRS to the base station apparatus 100 in a subframe (subframe n+4) 4 subframes after the subframe in which the DCI format including instructions for transmission of A-SRS and a parameter is notified from the base station apparatus 100.

For example, when among a plurality of DCI formats notified from the base station apparatus 100, the DCI format A includes instructions for transmission of A-SRS and a parameter (when the DCI format A including instructions for transmission of A-SRS and a parameter is notified, when the DCI format A including instructions for transmission of A-SRS and a parameter is detected), the mobile station apparatus 200 is capable of transmitting the A-SRS to the base station apparatus 100.

Further, for example, when among a plurality of DCI formats notified from the base station apparatus 100, the DCI format B includes instructions for transmission of A-SRS and a parameter (when the DCI format B including instructions for transmission of A-SRS and a parameter is notified, when the DCI format B including instructions for transmission of A-SRS and a parameter is detected), the mobile station apparatus 200 is capable of transmitting the A-SRS to the base station apparatus 100.

Herein, it is beforehand defined by specifications or the like that the mobile station apparatus 200 transmits the A-SRS in the case that which DCI format includes instructions for transmission of A-SRS and a parameter among a plurality of DCI formats notified from the base station apparatus 100. In other words, it is beforehand defined between the base station apparatus 100 and the mobile station apparatus 200 that the A-SRS is transmitted and received in the case that which DCI format includes instructions for transmission of A-SRS and a parameter among a plurality of DCI formats notified from the base station apparatus 100.

Further, it may be set by the base station apparatus 100, for example, using RRC signaling that the mobile station apparatus 200 transmits the A-SRS in the case that which DCI format includes instructions for transmission of A-SRS and a parameter among a plurality of DCI formats notified from the base station apparatus 100. For example, the base station apparatus 100 is capable of setting the mobile station apparatus 200 for transmitting the A-SRS set based on a parameter in the case that the DCI format A includes instructions for transmission of A-SRS and the parameter.

Furthermore, in FIG. 6, the mobile station apparatus 200, which is notified of a plurality of DCI formats including at least one DCI format including instructions for transmission of A-SRS and a parameter from the base station apparatus 100 in the same subframe, gives a priority to a predetermined DCI format among the plurality of DCI formats, and when the DCI format of the priority includes instructions for transmission of A-SRS and a parameter, is capable of transmitting the A-SRS set based on the parameter to the base station apparatus 100.

For example, the mobile station apparatus 200 gives a priority to the DCI format A among a plurality of DCI formats notified from the base station apparatus 100, and when the DCI format A of the priority includes instructions for transmission of A-SRS and a parameter, is capable of transmitting the A-SRS to the base station apparatus 100.

Further, for example, the mobile station apparatus 200 gives a priority to the DCI format B among a plurality of DCI formats notified from the base station apparatus 100, and when the DCI format B of the priority includes instructions for transmission of A-SRS and a parameter, is capable of transmitting the A-SRS set based on the parameter to the base station apparatus 100.

Herein, it is beforehand defined by specifications or the like that to which DCI format the mobile station apparatus 200 gives a priority among a plurality of DCI formats notified from the base station apparatus 100. In other words, it is beforehand defined that the mobile station apparatus 200 operates according to which DCI format when the base station apparatus 100 notifies the mobile station apparatus 200 of a plurality of DCI formats in the same subframe. In other words, it is beforehand defined between the base station apparatus 100 and the mobile station apparatus 200 to operate according to which DCI format among a plurality of DCI formats when the base station apparatus 100 notifies of the plurality of DCI formats.

Further, it may be set by the base station apparatus 100, for example, using RRC signaling that the mobile station apparatus 200 operates according to which DCI format among a plurality of DCI formats notified from the base station apparatus 100. For example, the base station apparatus 100 is capable of setting the mobile station apparatus 200 for operating according to the DCI format A.

For example, it is beforehand defined between the base station apparatus 100 and the mobile station apparatus 200 that among a plurality of DCI formats notified from the base station apparatus 100 the DCI format B including instructions for transmission of A-SRS and a parameter is given the first priority, and that the DCI format A including instructions for transmission of A-SRS and a parameter is given the second priority. In other words, it is beforehand defined between the base station apparatus 100 and the mobile station apparatus 200 to operate according to the DCI format B including instructions for transmission of A-SRS and a parameter when a plurality of DCI formats is notified from the base station apparatus 100.

Further, for example, it may be beforehand defined between the base station apparatus 100 and the mobile station apparatus 200 that among a plurality of DCI formats notified from the base station apparatus 100 the DCI format B is given the first priority, and that the DCI format A is given the second priority. In other words, only priorities to the DCI format A and DCI format B may be beforehand defined. In other words, it may be beforehand defined between the base station apparatus 100 and the mobile station apparatus 200 to operate according to which DCI format among a plurality of DCI formats when the base station apparatus 100 notifies of the plurality of DCI formats (DCI format A, DCI format B).

For example, the mobile station apparatus 200, which is beforehand set for the definition for operating according to the DCI format B among a plurality of DCI formats notified from the base station apparatus 100, is capable of transmitting the A-SRS to the base station apparatus 100 when the DCI format B notified from the base station apparatus 100 includes instructions for transmission of A-SRS and a parameter. In other words, the mobile station apparatus 200, which is beforehand set for the definition for operating according to the DCI format B among a plurality of DCI formats notified from the base station apparatus 100, is capable of transmitting the A-SRS to the base station apparatus 100 according to the DCI format B including instructions for transmission of A-SRS and a parameter.

Meanwhile, for example, the mobile station apparatus 200, which is beforehand set for the definition for operating according to the DCI format B among a plurality of DCI formats notified from the base station apparatus 100, does not transmit the A-SRS to the base station apparatus 100 even when the DCI format A notified from the base station apparatus 100 includes instructions for transmission of A-SRS and a parameter. For example, the mobile station apparatus 200, which is beforehand set for the definition for operating according to the DCI format B among a plurality of DCI formats notified from the base station apparatus 100, transmits uplink data to the base station apparatus 100 using a PUSCH scheduled by the DCI format B that does not include instructions for transmission of A-SRS and a parameter.

Further, in FIG. 6, in the mobile station apparatus 200 notified of a plurality of DCI formats from the base station apparatus 100 in the same subframe, when all the plurality of DCI formats includes instructions for transmission of A-SRS and a parameter, the apparatus 200 is capable of transmitting the A-SRS, which is set based on the parameter notified in a predetermined subframe and/or predetermined DCI format, to the base station apparatus 100. Herein, the predetermined subframe and/or predetermined DCI format may be beforehand determined uniquely in the system, may be simultaneously notified from the base station apparatus 100 to mobile station apparatuses 200 as broadcast information, or may be notified from the base station apparatus 100 to the individual mobile station apparatus 200.

For example, when all of a plurality of DCI formats (first DCI formation, second DCI format and third DCI format) notified from the base station apparatus 100 includes instructions for transmission of A-SRS and a parameter, the mobile station apparatus 200 is capable of transmitting the A-SRS set based on the parameter to the base station apparatus 100.

As described in the foregoing, when the base station apparatus 100 notifies the mobile station apparatus 200 of a plurality of DCI formats in the same subframe, in the case that a predetermined DCI format includes instructions for transmission of A-SRS and a parameter, the mobile station apparatus 200 transmits the A-SRS set based on the parameter to the base station apparatus 100, and the base station apparatus 100 and the mobile station apparatus 200 are thereby capable of sharing (recognizing) that transmission of A-SRS by the mobile station apparatus 200 is performed.

Further, when the base station apparatus 100 notifies the mobile station apparatus 200 of a plurality of (different) DCI formats in the same subframe, in the case that all the plurality of DCI formats includes instructions for transmission of A-SRS and a parameter, the mobile station apparatus 200 transmits the A-SRS set based on the parameter to the base station apparatus 100, and the base station apparatus 10 and the mobile station apparatus 200 are thereby capable of sharing (recognizing) that transmission of A-SRS by the mobile station apparatus 200 is performed. Furthermore, also in the case of receiving a plurality of same DCI formats, the mobile station apparatus 200 may change the priority of the DCI format to transmit the A-SRS corresponding to the number of transmission antenna ports indicated from the base station apparatus 100.

For example, when instructions for transmission of A-SRS and a parameter are included in each of the DCI format A of one transmission antenna port and the DCI format A of two transmission antenna ports notified within some particular time period, it is also possible to give a priority to the DCI format A of two transmission antenna ports to transmit the A-SRS to the base station apparatus 100. The priories according to the number of transmission antenna ports may be beforehand determined uniquely in the system, may be simultaneously notified from the base station apparatus 100 to mobile station apparatuses 200 as broadcast information, or may be notified from the base station apparatus 100 to the individual mobile station apparatus 200. Further, corresponding to the number of transmission antenna ports given the priority, the apparatus 200 transmits the A-SRS to the base station apparatus 100.

Further, when the DCI format of one transmission antenna is given a priority, the A-SRS may be transmitted to the base station apparatus 100 using two transmission antenna ports. Alternatively, when the DCI format of two transmission antennas is given a priority, the A-SRS may be transmitted to the base station apparatus 100 using one transmission antenna port. These transmission methods of A-SRS may be beforehand determined uniquely in the system, may be simultaneously notified from the base station apparatus 100 to mobile station apparatuses 200 as broadcast information, or may be notified from the base station apparatus 100 to the individual mobile station apparatus 200.

Based on the A-SRS transmitted from the mobile station apparatus 200, the base station apparatus 100 schedules the mobile station apparatus 200, and for example, is capable of performing allocation of PUSCH resources, determination of modulation scheme and coding rate to apply to the PUSCH and the like. In other words, the base station apparatus 100 is capable of performing efficient scheduling on the mobile station apparatus 200.

Embodiment 2

Described next is Embodiment 2 in a mobile communication system using the base station apparatus 100 and mobile station apparatus 200. In Embodiment 2, the base station apparatus 100 notifies the mobile station apparatus 200 of a plurality of DCI formats including at least one DCI format including instructions for transmission of SRS and a parameter for some particular time period, and when among the plurality of DCI formats, a predetermined DCI format includes instructions for transmission of SRS and the parameter, the mobile station apparatus 200 transmits the SRS to the base station apparatus 100. In other words, the base station apparatus 100 notifies the mobile station apparatus 200 of a plurality of DCI formats for some particular time period, and when among the plurality of DCI formats, at least one DCI format includes instructions for transmission of SRS and the parameter, the mobile station apparatus 200 transmits the SRS to the base station apparatus 100.

Further, the base station apparatus 100 notifies the mobile station apparatus 200 of a plurality of DCI formats including at least one DCI format including instructions for transmission of SRS and a parameter for some particular time period, and when instructions for transmission of SRS and a parameter are included in a DCI format notified in a subframe nearest a subframe a predetermined number of subframes before a subframe to transmit the SRS, the mobile station apparatus 200 transmits the SRS to the base station apparatus 100. For example, when instructions for transmission of A-SRS and a parameter are included in a DCI format notified in a subframe before a subframe nearest a subframe a predetermined number of subframes before a subframe to transmit the SRS and the parameter of the A-SRS is already set, resetting is made based on the parameter notified in the nearest subframe (setting of the parameter of the A-SRS is rewritten (updated)).

Further, the base station apparatus 100 notifies the mobile station apparatus 200 of a plurality of DCI formats for some particular time period, and when all the plurality of DCI formats includes instructions for transmission of SRS and a parameter, the mobile station apparatus 200 transmits the SRS notified in a predetermined subframe and/or predetermined DCI format to the base station apparatus 100.

Herein, some particular time period includes a time period between the next subframe after the mobile station apparatus 200 transmits the SRS to the base station apparatus 100 and a subframe to transmit the SRS again to the base station apparatus 100. Further, some particular time period includes a time period between a subframe in which the mobile station apparatus 200 transmits the SRS to the base station apparatus 100 and a subframe to transmit the SRS again to the base station apparatus 100. In other words, some particular time period includes a time period between SRS subframes (contiguous SRS subframes) set by the base station apparatus 100. For example, some particular time period includes a time period of from subframe n−1 to subframe n+6 in FIG. 8 as described later. Further, for example, some particular time period includes a time period of from subframe n−2 to subframe n+6 in FIG. 8.

Further, some particular time period includes a time period between the next subframe after the mobile station apparatus 200 transmits the SRS to the base station apparatus 100 and a subframe a predetermined number of subframes before (for example, a subframe 4 subframes before) a subframe to transmit the SRS again to the base station apparatus 100. Furthermore, some particular time period includes a time period between a subframe in which the mobile station apparatus 200 transmits the SRS to the base station apparatus 100 and a subframe a predetermined number of subframes before (for example, a subframe 4 subframes before) a subframe to transmit the SRS again to the base station apparatus 100. For example, some particular time period includes a time period of from subframe n−1 to subframe n+2 in FIG. 8 as described later. Further, for example, some particular time period includes a time period of from subframe n−2 to subframe n+2 in FIG. 8.

Figure 7:
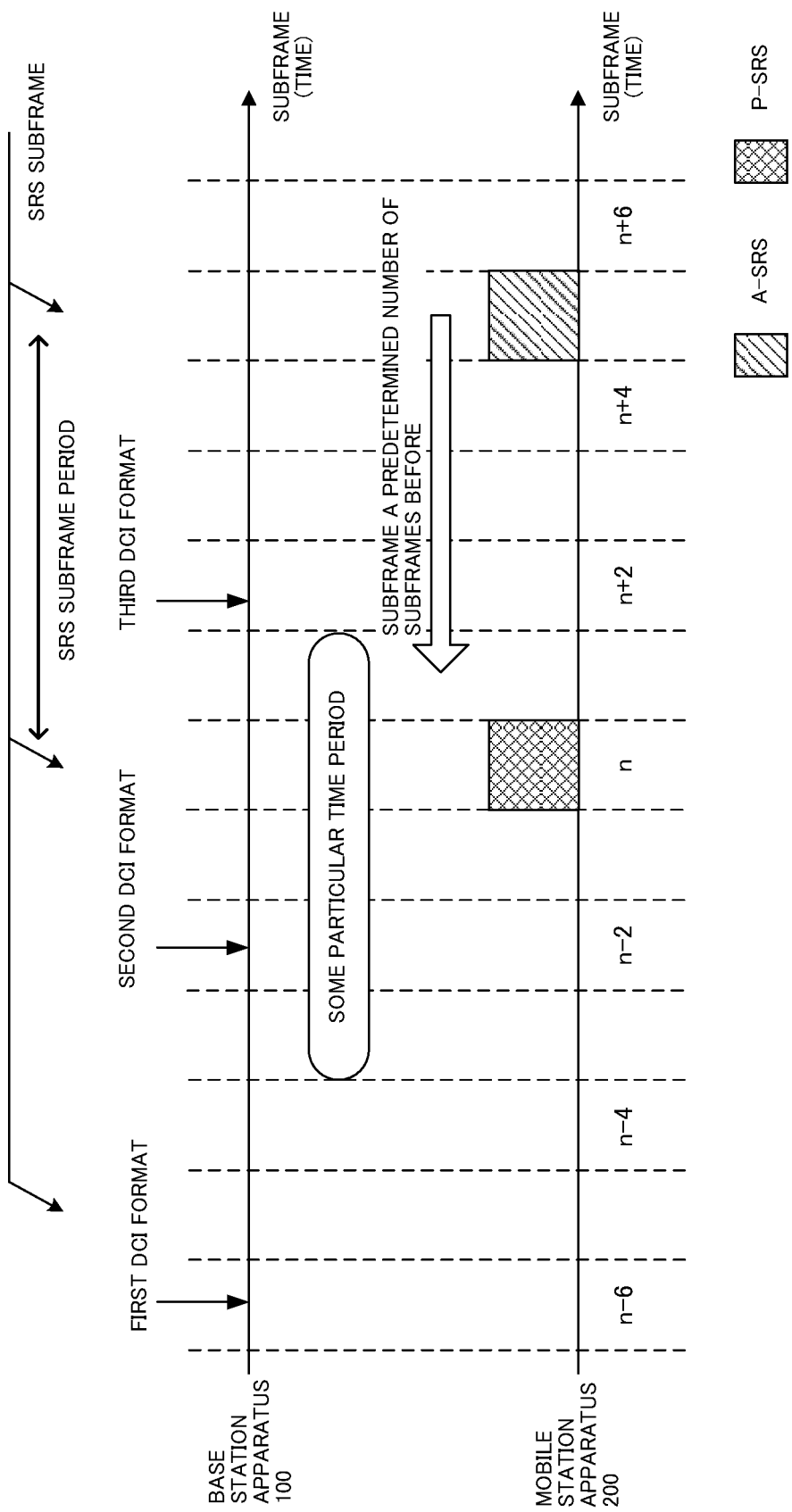
FIG. 7 is a diagram showing Example 2 of transmission of A-SRS by the mobile station apparatus.

Furthermore, some particular time period includes a time period corresponding to an SRS subframe period set by the base station apparatus 100 from a subframe a predetermined number of SRS subframes before. In other words, some particular time period is given the same value (length) as the SRS subframe period. For example, in the case that the SRS subframe period is 5 subframes, and that the predetermined number of subframes that is a predetermined number of subframes before is "4", some particular time period includes a time period of from subframe n−3 to subframe n+1 in FIG. 7. Herein, the period of the SRS subframe is may be specific to the cell, specific to the mobile station apparatus, or beforehand unique in the system. When the DCI format received within the time period includes instructions for transmission of A-SRS, the A-SRS is transmitted in a first SRS subframe after the time period. In other words, in FIG. 7, when the second format includes instructions for transmission of A-SRS and a parameter, the A-SRS is transmitted to the base station apparatus 100 in a subframe n+5.

For example, assuming that the SRS subframe is a subframe n, some particular time period is expressed by from n−k−a_Period+1 to n−k. Herein, a_Period represents the SRS subframe period set by the base station apparatus 100, and k represents a predetermined value (for example, k=4).

Herein, the subframe in which the mobile station apparatus 200 transmits the SRS to the base station apparatus 100 includes a subframe in which the mobile station apparatus 200 transmits the P-SRS to the base station apparatus 100. Further, the subframe in which the mobile station apparatus 200 transmits the SRS to the base station apparatus 100 includes a subframe in which the mobile station apparatus 200 transmits the A-SRS to the base station apparatus 100.

Further, some particular time period includes a time period that the base station apparatus 100 sets on the mobile station apparatus 200. For example, using the broadcast information, the base station apparatus 100 is capable of setting some particular time period on the mobile station apparatus 200. Furthermore, for example, using RRC signaling, the base station apparatus 100 is capable of setting some particular time period on the mobile station apparatus 200.

Moreover, the base station apparatus 100 is capable of setting a subframe in which the mobile station apparatus 200 transmits the SRS to the base station apparatus on the mobile station apparatus 200 specifically for the cell. Further, the base station apparatus 100 is capable of setting a subframe in which the mobile station apparatus 200 transmits the SRS to the base station apparatus 100 on the mobile station apparatus 200 specifically for the mobile station apparatus. The mobile station apparatus 200 is capable of transmitting the SRS to the base station apparatus 100 in a subframe set from the base station apparatus 100.

Further, the base station apparatus 100 is capable of allocating a DCI format including instructions for transmission of SRS and a parameter to a mobile station apparatus specific search space (USS: UE specific Search Space). Herein, the base station apparatus 100 is capable of including downlink scheduling information in the DCI format including instructions for transmission of SRS and a parameter allocated to the USS to notify the mobile station apparatus 200. Furthermore, the base station apparatus 100 is capable of including uplink scheduling information in the DCI format including instructions for transmission of SRS and a parameter allocated to the USS to notify the mobile station apparatus 200.

Moreover, the base station apparatus 100 is capable of allocating a DCI format including instructions for transmission of SRS and a parameter to a common search space (CSS).

Embodiment 2 is applicable to a mobile communication system similar to the mobile communication system as described in Embodiment 1. In other words, Embodiment 2 is applicable to both the mobile communication system subjected to symmetric carrier aggregation and the mobile communication system subjected to asymmetric carrier aggregation.

As described in Embodiment 1, the base station apparatus 100 is capable of instructing the mobile station apparatus 200 to transmit the P-SRS. Further, the base station apparatus 100 is capable of instructing the mobile station apparatus 200 to transmit the A-SRS. Herein, instructions for transmission of P-SRS and a parameter, and instructions for transmission of A-SRS and a parameter by the base station apparatus 100 are as described in Embodiment 1, and therefore, are omitted.

Meanwhile, the mobile station apparatus 200 is capable of transmitting the P-SRS periodically to the base station apparatus 100 according to instructions from the base station apparatus 100. Further, the mobile station apparatus 200 is capable of transmitting the A-SRS non-periodically to the base station apparatus 100 according to instructions from the base station apparatus 100. Herein, transmission of P-SRS and transmission of A-SRS by the mobile station apparatus 200 is as described in Embodiment 1, and therefore, is omitted.

Figure 8:
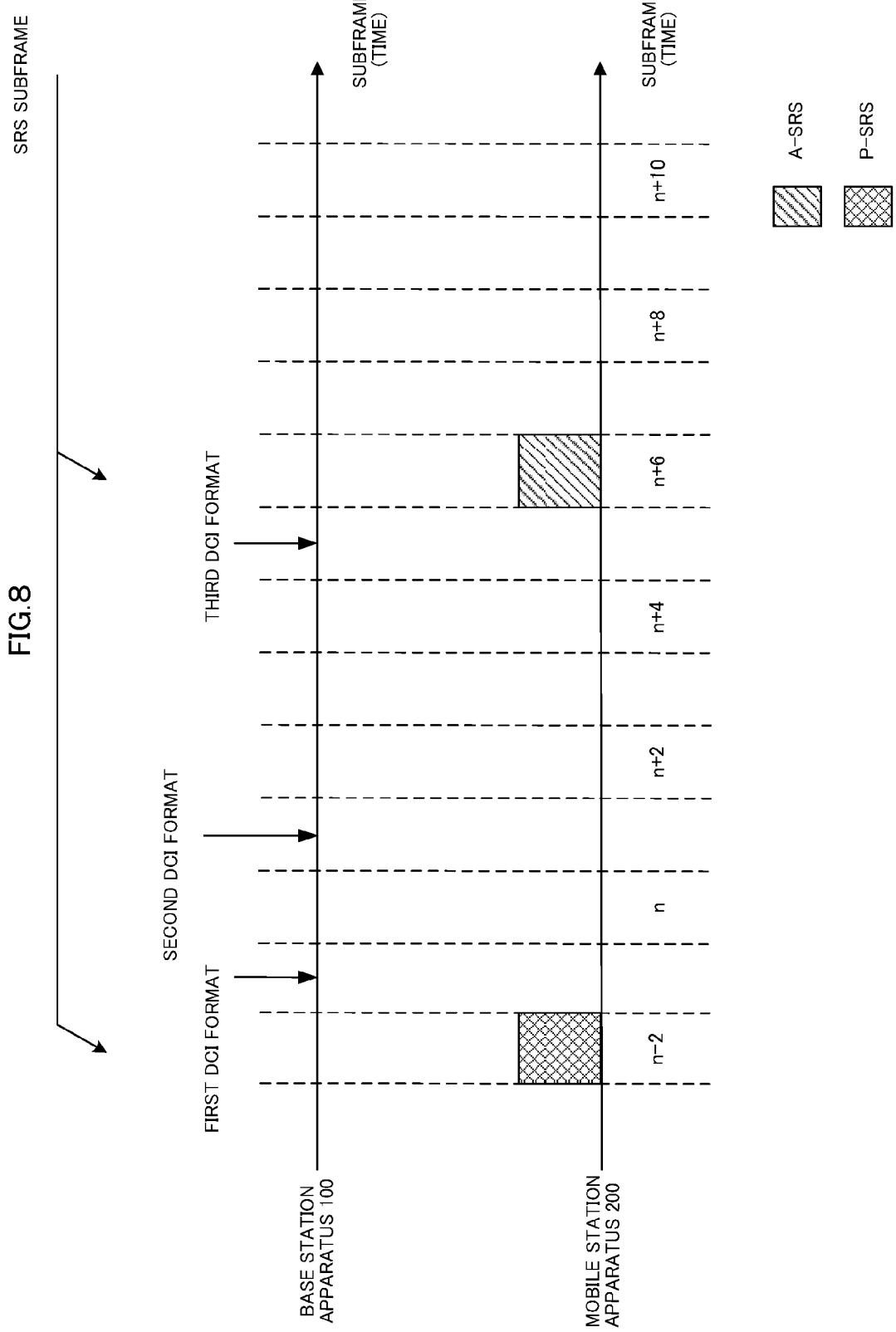
FIG. 8 is a diagram showing Example 3 of transmission of A-SRS by the mobile station apparatus.
Figure 9:
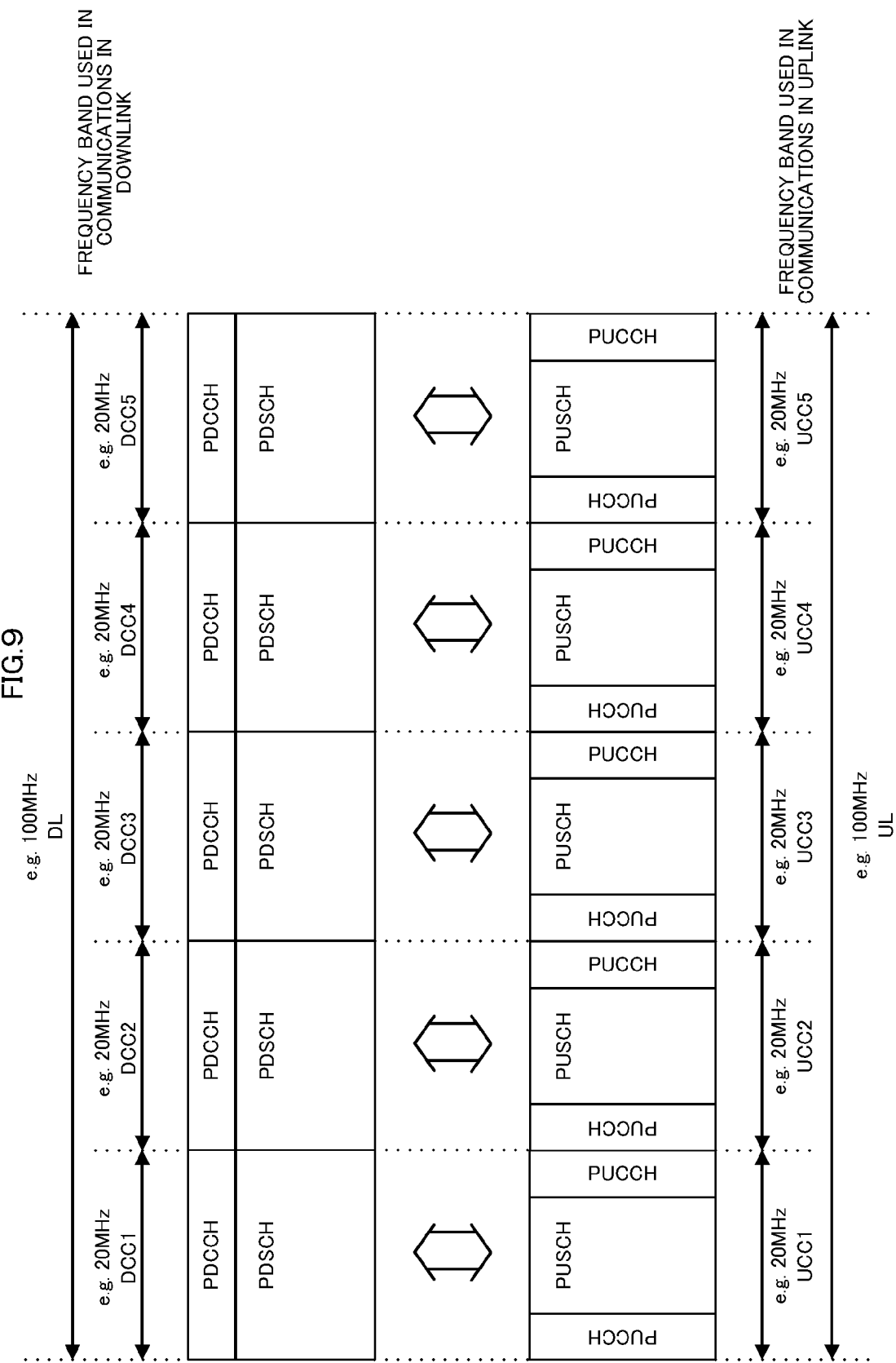
FIG. 9 is a diagram showing an example of carrier aggregation in conventional techniques.

FIG. 8 is a diagram to explain an example of A-SRS transmission by the mobile station apparatus 200. In FIG. 8, the horizontal axis represents the subframe (time). Further, it is shown that the base station apparatus 100 sets the mobile station apparatus 200 for subframe n−2 and subframe n+6 as the SRS subframe. Furthermore, it is shown that the mobile station apparatus 200 transmits the P-SRS (shown by mesh lines) in the subframe n−2 set by the base station apparatus 100. Still furthermore, it is shown that the mobile station apparatus 200 transmits the A-SRS (shown by diagonal lines) in the subframe n+6 set by the base station apparatus 100.

In other words, in FIG. 8, the mobile station apparatus 200 transmits the A-SRS to the base station apparatus 100 in a first SRS subframe (SRS transmittable subframe) after a subframe in which the DCI format (that may be the PDCCH) including instructions for transmission of A-SRS and a parameter is notified from the base station apparatus 100.

In FIG. 8, the base station apparatus 100 is capable of notifying the mobile station apparatus 200 of a plurality of DCI formats including at least one DCI format including instructions for transmission of A-SRS and a parameter for some particular time period. In other words, the base station apparatus 100 is capable of notifying the mobile station apparatus 200 of a plurality of different DCI formats for some particular time period. FIG. 8 shows that the base station apparatus 100 notifies the mobile station apparatus 200 of a plurality of DCI formats (shown by the first DCI format, second DCI format, and third DCI format) including at least one DCI format including instructions for transmission of A-SRS and a parameter respectively in subframes n−1, n+1 and n+5.

Herein, in the following description, the description is given while assuming that some particular time period is a time period between a subframe after the mobile station apparatus 200 transmits the SRS to the base station apparatus 100 and a subframe to transmit the SRS again to the base station apparatus 100, but as a matter of course, the similar Embodiment is applicable as long as some particular time period is the time period as described above. Further, in FIG. 8, as an example, the base station apparatus 100 notifies the mobile station apparatus 200 of three DCI formats for some particular time period, but it is natural that the number of DCI formats notified by the base station apparatus 100 for some particular time period is any number.

Herein, the DCI format that the base station apparatus 100 notifies the mobile station apparatus 200 includes the DCI format A and DCI format B as described above. Further, the DCI format that the base station apparatus 100 notifies the mobile station apparatus 200 includes the DCI format A including instructions for transmission of A-SRS and a parameter and DCI format B including instructions for transmission of A-SRS and a parameter as described above.

In FIG. 8, in the mobile station apparatus 200 notified of a plurality of DCI formats including at least one DCI format including instructions for transmission of A-SRS and a parameter from the base station apparatus 100 for some particular time period, when among the plurality of DCI formats a predetermined DCI format includes instructions for transmission of A-SRS and a parameter, the mobile station apparatus 200 is capable of transmitting the A-SRS to the base station apparatus 100.

For example, when among a plurality of DCI formats notified from the base station apparatus 100, the DCI format A includes instructions for transmission of A-SRS and a parameter (when the DCI format A including instructions for transmission of A-SRS and a parameter is notified, when the DCI format A including instructions for transmission of A-SRS and a parameter is detected), the mobile station apparatus 200 is capable of transmitting the A-SRS to the base station apparatus 100.

Further, for example, when among a plurality of DCI formats notified from the base station apparatus 100, the DCI format B includes instructions for transmission of A-SRS and a parameter (when the DCI format B including instructions for transmission of A-SRS and a parameter is notified, when the DCI format B including instructions for transmission of A-SRS and a parameter is detected), the mobile station apparatus 200 is capable of transmitting the A-SRS to the base station apparatus 100.

Herein, it is beforehand defined by specifications or the like that the mobile station apparatus 200 transmits the A-SRS in the case that which DCI format includes instructions for transmission of A-SRS and a parameter among a plurality of DCI formats notified from the base station apparatus 100. In other words, it is beforehand defined between the base station apparatus 100 and the mobile station apparatus 200 that the A-SRS is transmitted and received in the case that which DCI format includes instructions for transmission of A-SRS and a parameter among a plurality of DCI formats notified from the base station apparatus 100.

Further, it may be set by the base station apparatus 100, for example, using RRC signaling that the mobile station apparatus 200 transmits the A-SRS in the case that which DCI format includes instructions for transmission of A-SRS and a parameter among a plurality of DCI formats notified from the base station apparatus 100. For example, the base station apparatus 100 is capable of setting the mobile station apparatus 200 for transmitting the A-SRS in the case that the DCI format A includes instructions for transmission of A-SRS and a parameter.

Furthermore, in FIG. 8, the mobile station apparatus 200, which is notified of a plurality of DCI formats including at least one DCI format including instructions for transmission of A-SRS and a parameter from the base station apparatus 100 for some particular time period, gives a priority to a predetermined DCI format among the plurality of DCI formats, and when the DCI format of the priority includes instructions for transmission of A-SRS and a parameter, is capable of transmitting the A-SRS set based on the parameter to the base station apparatus 100.

For example, the mobile station apparatus 200 gives a priority to the DCI format A among a plurality of DCI formats notified from the base station apparatus 100, and when the DCI format A of the priority includes instructions for transmission of A-SRS and a parameter, is capable of transmitting the A-SRS set based on the parameter to the base station apparatus 100.

Further, for example, the mobile station apparatus 200 gives a priority to the DCI format B among a plurality of DCI formats notified from the base station apparatus 100, and when the DCI format B of the priority includes instructions for transmission of A-SRS and a parameter, is capable of transmitting the A-SRS to the base station apparatus 100.

Herein, it is beforehand defined by specifications or the like that to which DCI format the mobile station apparatus 200 gives a priority among a plurality of DCI formats notified from the base station apparatus 100. In other words, it is beforehand defined that the mobile station apparatus 200 operates according to which DCI format when the base station apparatus 100 notifies the mobile station apparatus 200 of a plurality of DCI formats for some particular time period. In other words, it is beforehand defined between the base station apparatus 100 and the mobile station apparatus 200 to operate according to which DCI format among a plurality of DCI formats when the base station apparatus 100 notifies of the plurality of DCI formats.

Further, it may be set by the base station apparatus 100, for example, using RRC signaling that the mobile station apparatus 200 operates according to which DCI format among a plurality of DCI formats notified from the base station apparatus 100. For example, the base station apparatus 100 is capable of setting the mobile station apparatus 200 for operating according to the DCI format A.

For example, it is beforehand defined between the base station apparatus 100 and the mobile station apparatus 200 that among a plurality of DCI formats notified from the base station apparatus 100 the DCI format B including instructions for transmission of A-SRS and a parameter is given the first priority, and that the DCI format A including instructions for transmission of A-SRS and a parameter is given the second priority. In other words, it is beforehand defined between the base station apparatus 100 and the mobile station apparatus 200 to operate according to the DCI format B including instructions for transmission of A-SRS and a parameter when a plurality of DCI formats is notified from the base station apparatus 100.

Further, for example, it may be beforehand defined between the base station apparatus 100 and the mobile station apparatus 200 that among a plurality of DCI formats notified from the base station apparatus 100 the DCI format B is given the first priority, and that the DCI format A is given the second priority. In other words, only priorities to the DCI format A and DCI format B may be beforehand defined. In other words, it is beforehand defined between the base station apparatus 100 and the mobile station apparatus 200 to operate according to which DCI format among a plurality of DCI formats when the base station apparatus 100 notifies of the plurality of DCI formats (DCI format A, DCI format B).

For example, the mobile station apparatus 200, which is beforehand set for the definition for operating according to the DCI format B among a plurality of DCI formats notified from the base station apparatus 100, is capable of transmitting the A-SRS to the base station apparatus 100 when the DCI format B notified from the base station apparatus 100 includes instructions for transmission of A-SRS and a parameter. In other words, the mobile station apparatus 200, which is beforehand set for the definition for operating according to the DCI format B among a plurality of DCI formats notified from the base station apparatus 100, is capable of transmitting the A-SRS to the base station apparatus 100 according to the DCI format B including instructions for transmission of A-SRS and a parameter.

Meanwhile, for example, the mobile station apparatus 200, which is beforehand set for the definition for operating according to the DCI format B among a plurality of DCI formats notified from the base station apparatus 100, does not transmit the A-SRS to the base station apparatus 100 even when the DCI format A notified from the base station apparatus 100 includes instructions for transmission of A-SRS and a parameter. For example, the mobile station apparatus 200, which is beforehand set for the definition for operating according to the DCI format B among a plurality of DCI formats notified from the base station apparatus 100, transmits uplink data to the base station apparatus 100 using a PUSCH scheduled by the DCI format B that does not include instructions for transmission of A-SRS and a parameter.

Further, in FIG. 8, in the mobile station apparatus 200 notified of a plurality of DCI formats including at least one DCI format including instructions for transmission of A-SRS and a parameter from the base station apparatus 100 for some particular time period, when instructions for transmission of A-SRS and a parameter are included in a DCI format notified in a subframe nearest (latest subframe, immediately before) a subframe a predetermined number of subframes before (for example, a subframe 4 subframes before) a subframe to transmit the SRS, the mobile station apparatus 200 is capable of transmitting the A-SRS to the base station apparatus 100.

In other words, the mobile station apparatus 200 is capable of operating according to the DCI format notified in the subframe nearest the subframe a predetermined number of subframes before (for example, the subframe 4 subframes before) the subframe to transmit the SRS.

For example, in FIG. 8, the mobile station apparatus 200, which is notified of a plurality of DCI formats including at least one DCI format including instructions for transmission of A-SRS and a parameter for some particular time period (for example, a time period of from subframe n−1 to subframe n+6), transmits the A-SRS in the subframe n+6. In other words, the subframe in which the mobile station apparatus 200 transmits the SRS is the subframe n+6.

In other words, in FIG. 8, when instructions for transmission of A-SRS and a parameter are included in a DCI format notified in a subframe nearest a subframe a predetermined number of subframes before (for example, subframe n+2 4 subframes before) a subframe (subframe n+6) to transmit the SRS, the mobile station apparatus 200 is capable of transmitting the A-SRS to the base station apparatus 100.

In other words, the mobile station apparatus 200 is capable of operating according to the DCI format notified in the subframe nearest the subframe a predetermined number of subframes before (for example, subframe n+2 4 subframes before) the subframe (subframe n+6) to transmit the SRS.

In other words, in FIG. 8, when instructions for transmission of A-SRS and a parameter are included in the second DCI format notified in a subframe nearest a subframe a predetermined number of subframes before (for example, subframe n+2 4 subframes before) a subframe (subframe n+6) to transmit the SRS, the mobile station apparatus 200 is capable of transmitting the A-SRS to the base station apparatus 100. In other words, the mobile station apparatus 200 is capable of operating according to the second DCI format notified in the subframe nearest the subframe a predetermined number of subframes before (for example, subframe n+2 4 subframes before) the subframe (subframe n+6) to transmit the SRS.

In FIG. 8, the mobile station apparatus 200, which recognizes that the apparatus 200 operates according to the second DCI format among a plurality of DCI formats notified from the base station apparatus 100, is capable of transmitting the A-SRS to the base station apparatus 100 when the second DCI format notified from the base station apparatus 100 includes instructions for transmission of A-SRS and a parameter. In other words, the mobile station apparatus 200, which recognizes that the apparatus 200 operates according to the second DCI format among a plurality of DCI formats notified from the base station apparatus 100, is capable of transmitting the A-SRS to the base station apparatus 100 according to the second DCI format including instructions for transmission of A-SRS and a parameter.

Meanwhile, for example, the mobile station apparatus 200, which recognizes that the apparatus 200 operates according to the second DCI format among a plurality of DCI formats notified from the base station apparatus 100, does not transmit the A-SRS to the base station apparatus 100 even when the first DCI format and/or the third DCI format notified from the base station apparatus 100 includes instructions for transmission of A-SRS and a parameter. For example, the mobile station apparatus 200, which recognizes that the apparatus 200 operates according to the second DCI format among a plurality of DCI formats notified from the base station apparatus 100, transmits uplink data to the base station apparatus 100 using a PUSCH scheduled by the second DCI format that does not include instructions for transmission of A-SRS and a parameter.

Further, in FIG. 8, in the mobile station apparatus 200 notified of a plurality of DCI formats including at least one DCI format including instructions for transmission of A-SRS and a parameter from the base station apparatus 100 for some particular time period, when instructions for transmission of A-SRS and a parameter are included in a DCI format notified in a subframe nearest (latest subframe, immediately before) a subframe to transmit the SRS, the mobile station apparatus 200 is capable of transmitting the A-SRS to the base station apparatus 100.

In other words, the mobile station apparatus 200 is capable of operating according to the DCI format notified in the subframe nearest the subframe to transmit the SRS.

For example, in FIG. 8, the mobile station apparatus 200, which is notified of a plurality of DCI formats including at least one DCI format including instructions for transmission of A-SRS and a parameter for some particular time period (for example, a time period of from subframe n−1 to subframe n+6), transmits the A-SRS in the subframe n+6. In other words, the subframe in which the mobile station apparatus 200 transmits the SRS is the subframe n+6.

In other words, in FIG. 8, when instructions for transmission of A-SRS and a parameter are included in a DCI format notified in a subframe nearest a subframe (subframe n+6) to transmit the SRS, the mobile station apparatus 200 is capable of transmitting the A-SRS to the base station apparatus 100. In other words, the mobile station apparatus 200 is capable of operating according to the DCI format notified in the subframe nearest the subframe (subframe n+6) to transmit the SRS.

In other words, in FIG. 8, when instructions for transmission of A-SRS and a parameter are included in the third DCI format notified in a subframe nearest a subframe (subframe n+6) to transmit the SRS, the mobile station apparatus 200 is capable of transmitting the A-SRS to the base station apparatus 100. In other words the mobile station apparatus 200 is capable of operating according to the third DCI format notified in the subframe nearest the subframe (subframe n+6) to transmit the SRS.

In other words, in FIG. 8, the mobile station apparatus 200, which recognizes that the apparatus 200 operates according to the third DCI format among a plurality of DCI formats notified from the base station apparatus 100, is capable of transmitting the A-SRS to the base station apparatus 100 when the third DCI format notified from the base station apparatus 100 includes instructions for transmission of A-SRS and a parameter. In other words, the mobile station apparatus 200, which recognizes that the apparatus 200 operates according to the third DCI format among a plurality of DCI formats notified from the base station apparatus 100, is capable of transmitting the A-SRS to the base station apparatus 100 according to the third DCI format including instructions for transmission of A-SRS and a parameter.

Meanwhile, for example, the mobile station apparatus 200, which recognizes that the apparatus 200 operates according to the third DCI format among a plurality of DCI formats notified from the base station apparatus 100, does not transmit the A-SRS to the base station apparatus 100 even when the first DCI format and/or the second DCI format notified from the base station apparatus 100 includes instructions for transmission of A-SRS and a parameter. For example, the mobile station apparatus 200, which recognizes that the apparatus 200 operates according to the third DCI format among a plurality of DCI formats notified from the base station apparatus 100, transmits uplink data to the base station apparatus 100 using a PUSCH scheduled by the third DCI format that does not include instructions for transmission of A-SRS and a parameter.

Herein, the subframe (that may be an SRS subframe) for the mobile station apparatus 200 to transmit the SRS may be included in some particular time period. Further, the subframe (that may be an SRS subframe) for the mobile station apparatus 200 to transmit the SRS may be a subframe (that may be an SRS subframe) for the mobile station apparatus 200 to last transmit the SRS during some particular time period. Furthermore, the subframe (that may be an SRS subframe) for the mobile station apparatus 200 to transmit the SRS includes a subframe to transmit the P-SRS. Still furthermore, the subframe (that may be an SRS subframe) for the mobile station apparatus 200 to transmit the SRS includes a subframe to transmit the A-SRS.

Further, in FIG. 8, in the mobile station apparatus 200 notified of a plurality of DCI formats from the base station apparatus 100 for some particular time period, when all the plurality of DCI formats includes instructions for transmission of A-SRS and a parameter, the apparatus 200 is capable of transmitting the A-SRS, which is set based on the parameter notified in a predetermined subframe and/or predetermined DCI format, to the base station apparatus 100.

For example, when all of a plurality of DCI formats (first DCI formation, second DCI format and third DCI format) notified from the base station apparatus 100 includes instructions for transmission of A-SRS and a parameter, the mobile station apparatus 200 is capable of transmitting the A-SRS to the base station apparatus 100.

As described in the foregoing, when the base station apparatus 100 notifies the mobile station apparatus 200 of a plurality of DCI formats for some particular time period, in the case that a predetermined DCI format includes instructions for transmission of A-SRS and a parameter, the mobile station apparatus 200 transmits the A-SRS set based on the notified parameter to the base station apparatus 100, and the base station apparatus 100 and the mobile station apparatus 200 are thereby capable of sharing (recognizing) that transmission of A-SRS by the mobile station apparatus 200 is performed.

Meanwhile, when the base station apparatus 100 notifies the mobile station apparatus 200 of a plurality of DCI formats for some particular time period, in the case that instructions for transmission of A-SRS and a parameter are included in a DCI format notified in a subframe nearest a subframe a predetermined number of subframes before a subframe to transmit the SRS, the mobile station apparatus 200 transmits the A-SRS set based on the parameter to the base station apparatus 100, and the base station apparatus 100 and the mobile station apparatus 200 are thereby capable of sharing (recognizing) that transmission of A-SRS by the mobile station apparatus 200 is performed.

Further, when the base station apparatus 100 notifies the mobile station apparatus 200 of a plurality of DCI formats for some particular time period, in the case that all the plurality of DCI formats includes instructions for transmission of A-SRS and a parameter, the mobile station apparatus 200 transmits the A-SRS, which is set based on the parameter notified in a predetermined subframe and/or predetermined DCI format, to the base station apparatus 100, and the base station apparatus 100 and the mobile station apparatus 200 are thereby capable of sharing (recognizing) that transmission of A-SRS by the mobile station apparatus 200 is performed.

Based on the A-SRS transmitted from the mobile station apparatus 200, the base station apparatus 100 schedules the mobile station apparatus 200, and for example, is capable of performing allocation of PUSCH resources, determination of modulation scheme and coding rate to apply to the PUSCH and the like. In other words, the base station apparatus 100 is capable of performing efficient scheduling on the mobile station apparatus 200.

The Embodiments as described above are also applied to integrated circuits/chip sets installed in the base station apparatus 100 and the mobile station apparatus 200. Further, in the above-mentioned Embodiments, a program to actualize each function inside the base station apparatus 100 and each function inside the mobile station apparatus 200 may be stored in a computer readable storage medium, and the program stored in the storage medium may be read by a computer system and executed to perform control of the base station apparatus 100 and the mobile station apparatus 200. In addition, the "computer system" described herein is assumed to include the OS and hardware of peripheral devices and the like.

Further, the "computer readable storage medium" means transportable media such as a flexible disk, magneto-optical disk, ROM, CD-ROM and the like, and storage devices such as a hard disk and the like incorporated into the computer system. Furthermore, the "computer readable storage medium" is intended to include media that dynamically hold the program for a short time, such as communication lines in the case where the program is transmitted via communication channels of a network such as the Internet and telephone lines, and media that hold the program for a certain time, such as volatile memory inside the computer system that is the server or client in this case. Moreover, the above-mentioned program may be to actualize a part of the functions as described previously, and further, may be to actualize the functions as described previously in combination with a program already stored in the computer system.

As mentioned above, the Embodiments of the invention are described specifically with reference to the drawings, but specific configurations are not limited to the Embodiments, and designs and others in the scope without departing from the subject matter of the invention are included in the scope of claims.

DESCRIPTION OF SYMBOLS

100 Base station apparatus
101 Data control part
102 Transmission data modulation part
103 Radio part
104 Scheduling part
105 Channel estimation part
106 Reception data demodulation part
107 Data extraction part
108 Higher layer
109 Antenna
110 Radio resource control part
200, 200-1, 200-2, 200-3 Mobile station apparatus
201 Data control part
202 Transmission data modulation part
203 Radio part
204 Scheduling part
205 Channel estimation part
206 Reception data demodulation part
207 Data extraction part
208 Higher layer
209 Antenna
210 Radio resource control part

The invention claimed is:

1. A mobile station apparatus that is configured to communicate with a base station apparatus, the mobile station apparatus comprising:
   a reception circuitry configured to receive, from the base station apparatus, a downlink control information format including information requesting the mobile station apparatus to transmit a sounding reference signal; and
   a transmission circuitry configured to transmit, to the base station apparatus, the sounding reference signal based on a detection of the information requesting the mobile station apparatus to transmit the sounding reference signal included in the downlink control information format, wherein
   in a case that the information requesting the mobile station apparatus to transmit the sounding reference signal included in the downlink control information format is detected within a time period T, the transmission circuitry is configured to transmit, to the base station apparatus, the sounding reference signal in a subframe n, and the time period T is expressed by formula:

$$n-k-a\_\text{Period}+1 \leq T \leq n-k, (k=4), \text{wherein}$$

the a_Period which corresponds to a periodicity for the transmission of the sounding reference signal and is configured by a higher layer.

2. A base station apparatus that is configured to communicate with a mobile station apparatus, the base station apparatus comprising:
- a transmission circuitry configured to transmit, to the mobile station apparatus, a downlink control information format including information requesting the mobile station apparatus to transmit a sounding reference signal; and
- a reception circuitry configured to receive, from the mobile station apparatus, the sounding reference signal based on a detection of the information requesting the mobile station apparatus to transmit the sounding reference signal included in the downlink control information format, wherein
- in a case that the information requesting the mobile station apparatus to transmit the sounding reference signal included in the downlink control information format is detected within a time period T, the reception circuitry is configured to receive, from the mobile station apparatus, the sounding reference signal in a subframe n, and
- the time period T is expressed by formula:

$n-k-a\_Period+1 \le T \le n-k$, ($k=4$), wherein the a_Period which corresponds to a periodicity for the transmission of the sounding reference signal and is configured by a higher layer.

3. A method used for a mobile station apparatus, the method comprising:
- receiving, from a base station apparatus, a downlink control information format including information requesting the mobile station apparatus to transmit a sounding reference signal; and
- transmitting, to the base station apparatus, the sounding reference signal based on a detection of the information requesting the mobile station apparatus to transmit the sounding reference signal included in the downlink control information format, wherein
- transmitting, to the base station apparatus, the sounding reference signal in a subframe n in a case that the information requesting the mobile station apparatus to transmit the sounding reference signal included in the downlink control information format is detected within a time period T, and
- the time period T is expressed by formula:

$n-k-a\_Period+1 \le T \le n-k$, ($k=4$), wherein the a_Period which corresponds to a periodicity for the transmission of the sounding reference signal and is configured by a higher layer.

4. A method used for a base station apparatus, the method comprising:
- transmitting, to a mobile station apparatus, a downlink control information format including information requesting the mobile station apparatus to transmit a sounding reference signal; and
- receiving, from the mobile station apparatus, the sounding reference signal based on a detection of the information requesting the mobile station apparatus to transmit the sounding reference signal included in the downlink control information format, wherein
- receiving, from the mobile station apparatus, the sounding reference signal in a subframe n in a case that the information requesting the mobile station apparatus to transmit the sounding reference signal included in the downlink control information format is detected within a time period T, and
- the time period T is expressed by formula:

$n-k-a\_Period+1 \le T \le n-k$, ($k=4$), wherein the a_Period which corresponds to a periodicity for the transmission of the sounding reference signal and is configured by a higher layer.

* * * * *